(12) United States Patent
Kim

(10) Patent No.: US 9,063,659 B2
(45) Date of Patent: Jun. 23, 2015

(54) METHOD AND APPARATUS FOR DATA SECTOR CLUSTER-BASED DATA RECORDING

(75) Inventor: Ki Woong Kim, Gunpo-si (KR)

(73) Assignee: Seagate Technology LLC, Cupertino, CA (US)

( * ) Notice: Subject to any disclaimer, the term of this patent is extended or adjusted under 35 U.S.C. 154(b) by 19 days.

(21) Appl. No.: 13/459,012

(22) Filed: Apr. 27, 2012

(65) Prior Publication Data

US 2013/0027802 A1 Jan. 31, 2013

(30) Foreign Application Priority Data

Apr. 27, 2011 (KR) .......................... 10-2011-0039713

(51) Int. Cl.
*G11B 20/12* (2006.01)
*G06F 3/06* (2006.01)

(52) U.S. Cl.
CPC .......... *G06F 3/0611* (2013.01); *G11B 20/1217* (2013.01); *G11B 2020/1288* (2013.01); *G11B 2220/2516* (2013.01); *G06F 3/064* (2013.01); *G06F 3/0676* (2013.01)

(58) Field of Classification Search
None
See application file for complete search history.

(56) References Cited

U.S. PATENT DOCUMENTS

| 5,434,991 | A  | * | 7/1995 | Maeda et al. | ................. 711/112 |
| 7,440,221 | B2 |   | 10/2008 | Tsuchinaga et al. | |
| 7,982,994 | B1 |   | 7/2011 | Erden | |
| 8,179,627 | B2 |   | 5/2012 | Chang | |
| 8,270,256 | B1 |   | 9/2012 | Juang et al. | |
| 2003/0221095 | A1 | * | 11/2003 | Gaunt et al. | ....................... 713/1 |
| 2004/0047616 | A1 | * | 3/2004 | Uchiumi et al. | ............... 386/111 |
| 2004/0179286 | A1 | * | 9/2004 | Yang | ............................... 360/51 |
| 2007/0030588 | A1 | * | 2/2007 | Tsuchinaga et al. | ....... 360/77.08 |
| 2007/0122106 | A1 | * | 5/2007 | Ohnishi | ........................... 386/46 |
| 2010/0232049 | A1 | * | 9/2010 | Kompella et al. | ............... 360/55 |
| 2011/0085266 | A1 |   | 4/2011 | Kanai | |
| 2011/0222186 | A1 |   | 9/2011 | Itakura | |
| 2011/0292533 | A1 | * | 12/2011 | Nitta et al. | ...................... 360/31 |
| 2011/0292545 | A1 |   | 12/2011 | Katada | |
| 2012/0060073 | A1 |   | 3/2012 | Itakura | |
| 2012/0069466 | A1 |   | 3/2012 | Okamoto | |
| 2012/0082019 | A1 |   | 4/2012 | Harigae | |
| 2012/0099216 | A1 |   | 4/2012 | Grobis | |
| 2012/0162808 | A1 |   | 6/2012 | Masuda | |
| 2012/0194937 | A1 |   | 8/2012 | Tagami | |

OTHER PUBLICATIONS

Garth Gibson, Directions for Shingled-Write and Two-Dimensional Magnetic Recording System Architectures: Synergies with Solid-State Disks, Carnegie Mellon University, May 2009, pp. 1-2, Pittsburgh, US.

* cited by examiner

*Primary Examiner* — Wayne Young
*Assistant Examiner* — Mark Fischer
(74) *Attorney, Agent, or Firm* — Cesari & Reed LLP; Kirk A. Cesari; Christina W. Best

(57) ABSTRACT

Methods and apparatuses for data sector cluster-based data recording are disclosed. In one embodiment, an apparatus may comprise a processor configured to receive a write request containing host data for writing to a target location of a data storage medium. A target location may comprise one or more clusters, where a cluster may be multiple sequentially-numbered data storage addresses of the data storage medium. The processor may write at least one cluster of the target location with host data and dummy data pursuant to the write request, dummy data being arbitrary data written to fill data storage addresses in the target location not written by host data.

19 Claims, 24 Drawing Sheets

| LB NO | VB NO | LA VA |
|---|---|---|
| 0 | 2 | 199 |
| | 0 | 94 |
| 1 | | |
| 2 | 3 | 130 |
| 3 | 7 | 199 |
| | 1 | 155 |
| ⋮ | ⋮ | ⋮ |
| K-1 | | |
| K | K | 199 |
| | Q | 45 |

FIG. 21

| LBA NO | VA |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 86 |
| 11 | 87 |
| 12 | 88 |
| 13 | 89 |
| 14 | 90 |
| 15 | 91 |
| 16 | 92 |
| 17 | 93 |
| 18 | 94 |
| 20 | 15 |
| 21 | 16 |
| 50 | 38 |
| 51 | 39 |
| ⋮ | ⋮ |
| 59 | 47 |

FIG. 23A

METHOD AND APPARATUS FOR DATA SECTOR CLUSTER-BASED DATA RECORDING

CROSS-REFERENCE TO RELATED APPLICATION

This application claims priority under 35 U.S.C. §119(a) of Korean Patent Application No. 2011-0039713, filed on Apr. 27, 2011, the entire disclosure of which is hereby incorporated by reference.

BACKGROUND OF THE INVENTION

1. Field of the Invention

The present invention relates to a method and apparatus for writing data on a storage medium, and more particularly, to a method and apparatus for writing data in a storage device, by which a storage medium is accessed by using address mapping information.

2. Background of the Invention

A disk drive is a type of storage device that contributes to the operation of a computer system by writing or reading data on or from a storage medium in response to a command issued from a host machine. A variety of writing methods are being studied in order to improve the recording density of the disk drive. Moreover, there is ongoing research for improving access performance of a disk drive.

In one embodiment, a method may comprise: receiving a write request from a host containing host data for writing to a target location of a data storage medium, a target location comprising one or more clusters, a cluster having multiple sequentially-numbered data storage addresses of the data storage medium; and writing at least one cluster of the target location with host data and dummy data pursuant to the write request, dummy data being arbitrary data written to fill data storage addresses in the target location not written by host data.

In another embodiment, an apparatus may comprise a data storage medium, and a processor configured to: receive a write request from a host containing host data for writing to a target location of the data storage medium, a target location comprising one or more clusters, a cluster being multiple sequentially-numbered data storage addresses of the data storage medium; and write at least one cluster of the target location with host data and dummy data pursuant to the write request, dummy data being arbitrary data written to fill data storage addresses in the target location not written by host data.

In yet another embodiment, an apparatus may comprise a computer-readable storage medium storing instructions that when executed by a computer cause the computer to perform the method comprising: receiving a write request from a host containing host data for writing to a target location of a data storage medium, a target location comprising one or more clusters, a cluster being multiple sequentially-numbered data storage addresses of the data storage medium; and writing at least one cluster of the target location with host data and dummy data pursuant to the write request, dummy data being arbitrary data written to fill data storage addresses in the target location not written by host data.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 21 shows an example of address mapping information representing the allocation of virtual bands to logical bands shown in FIG. 10;

FIG. 23A illustrates an example of address mapping information about virtual band number 0 shown in FIG. 22;

DETAILED DESCRIPTION OF THE INVENTION

Figure 1A:
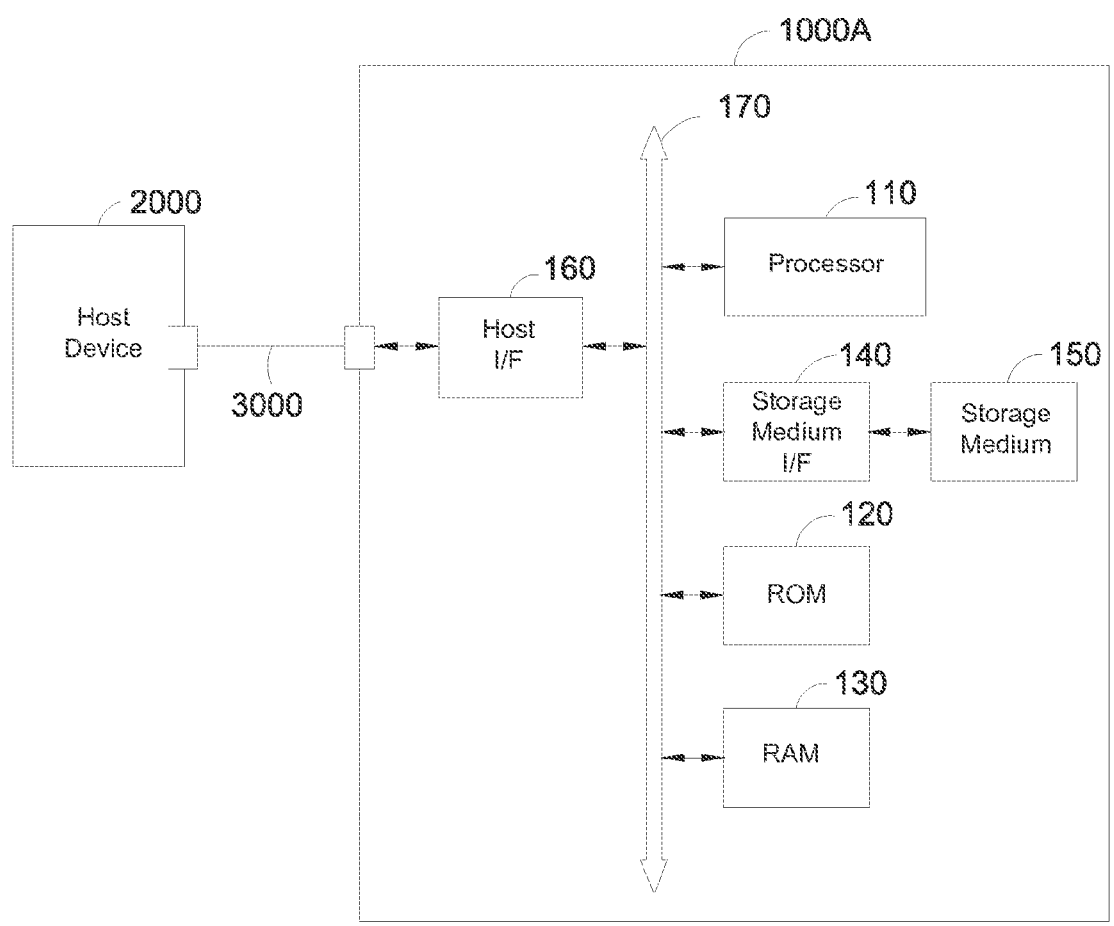
FIG. 1A is a block diagram of a computer system according to an embodiment of the inventive concept.

Embodiments of the inventive concept will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the inventive concept to those skilled in the art. Throughout the attached drawings, like reference numerals denote like elements.

According to the present invention, address mapping information can be simplified by performing a write operation such that alignment is performed on a storage medium in units of clusters. That is, the total number of address mapping information for the storage medium can be reduced since a large number of address mapping information is highly likely to be integrated into single address mapping information. The reduction in the number of address mapping information can shorten the searching time of address mapping information, thereby reducing access time. Therefore, an aspect of the present invention is to provide a data writing method for reducing the access time of a storage device using dynamic address translation.

Hereinafter, an exemplary embodiment of the present invention will be described in detail with reference to the accompanying drawings.

As shown in FIG. 1a, a computer system according to an embodiment of the inventive concept includes a storage device 1000A, a host device 2000, and a connector 3000.

More specifically, the storage device 1000A includes a processor 110, a ROM 120, a RAM 130, a storage medium interface (storage medium I/F) 140, a storage medium 150, a host interface (host I/F) 160, and a bus 170.

The host device 2000 performs a process of issuing a command for operating the storage device 1000A, transmitting it to the storage device 1000A connected via the connector 3000, and transmitting or receiving data to or from the storage device 1000A in response to the issued command.

The connector 3000 is means for electrically connecting an interface port of the host device 2000 and an interface port of the storage device 1000A, and includes a data connector and a power connector. For example, when a Serial Advanced Technology Attachment (SATA) I/F is used, the connector 3000 may include a 7-pin SATA data connector and a 15-pin SATA power connector.

First of all, the components of the storage device 1000A will be described.

The processor 110 interprets commands and controls the components of the storage device 1000A according to the interpretation results. The processor 110 may include a code object management unit, and may load a code object stored in the storage medium 150 to the RAM 130 using the code object management unit. The processor 110 loads code objects in the RAM 130 for executing a data writing method according to the flowcharts of FIGS. 15 to 20 and a method for managing cluster alignment in a write operation via a network according to the flowchart of FIG. 30.

Figure 30:
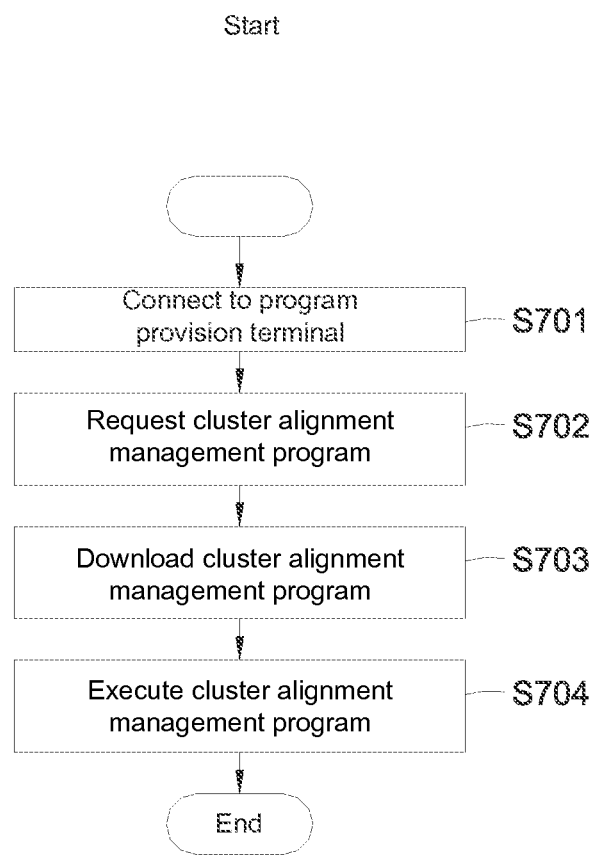
FIG. 30 is a flowchart of the method for managing cluster alignment in a write operation via a network according to an embodiment of the inventive concept.

The processor 110 then executes a task for the data writing method according to the flowcharts of FIGS. 15 to 20 and the method for managing cluster alignment in a write operation via a network according to the flowchart of FIG. 30 by using the code objects loaded in the RAM 130. The data writing method and the method for managing cluster alignment in a write operation via a network, which are executed by the processor 110, will be discussed in detail with reference to FIGS. 15 to 20 and FIG. 30 below.

The ROM 120 stores program codes and data necessary for operating the storage device 1000A.

The program codes and data stored in the ROM 120 and/or the storage medium 150 are loaded in the RAM 130 under control of the processor 110.

The storage medium 150 is a main storage medium of the storage device, and may include a disk or a non-volatile semiconductor memory device, for example. The storage device 1000A may thus include a disk drive, for example, and a detailed structure of a head disk assembly 100, including a disk and a head in the disk drive, is shown in FIG. 3.

Figure 3:
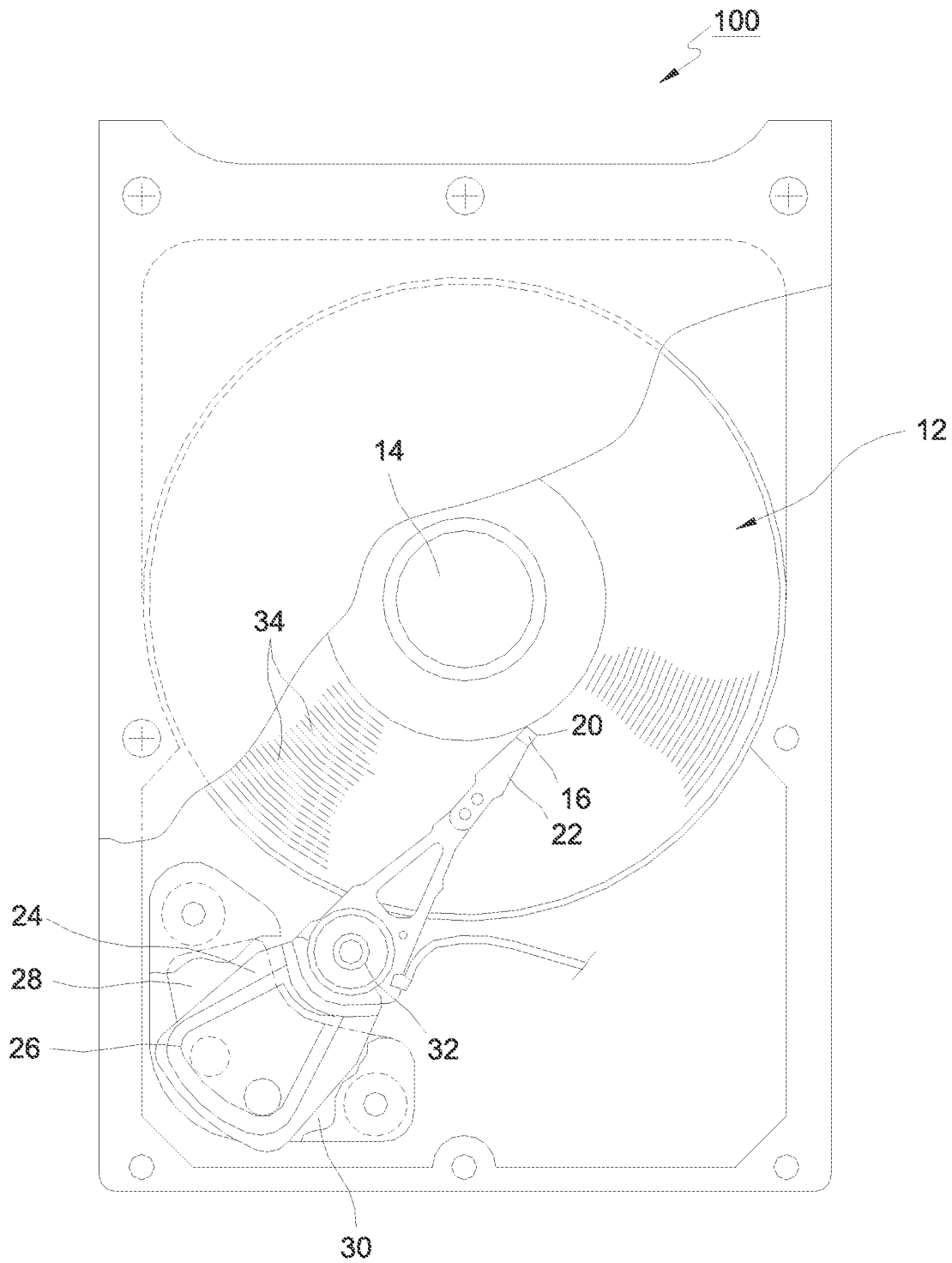
FIG. 3 is a top plan view of a head disk assembly of a disk drive according to an embodiment of the inventive concept.

Referring to FIG. 3, the head disk assembly 100 includes at least one disk 12 rotated by a spindle motor 14. The disk drive may also include a head 16 positioned adjacent to a surface of the disk 12.

The head 16 senses and magnetizes a magnetic field of each disk 12, thereby reading information from or writing information to the rotating disk 12. Typically, the head 16 is coupled to a surface of each disk 12. Although a single head 16 is illustrated, the head 16 needs to be regarded as including a write head for magnetizing the disk 12 and a separate read head for sensing the magnetic field of the disk 12. The read head may include a magneto-resistive (MR) element. The head 16 may be referred to as a magnetic head or a head.

The head 16 may be incorporated into a slider 20. The slider 20 is configured to generate an air bearing between the head 16 and the surface of the disk 12. The slider 20 is coupled to a head gimbal assembly 22 that is attached to an actuator arm 24 having a voice coil 26. The voice coil 26 is positioned adjacent to a magnetic assembly 28 so as to define a Voice Coil Motor (VCM) 30. A current provided to the voice coil 26 generates a torque which rotates the actuator arm 24 with respect to a bearing assembly 32. The rotation of the actuator arm 24 moves the head 16 across the surface of the disk 12.

Information is usually stored in ring-shaped tracks 34 of the disk 12. Each track 34 generally includes multiple sectors. A sector structure of a track is illustrated in FIG. 5.

Figure 5:
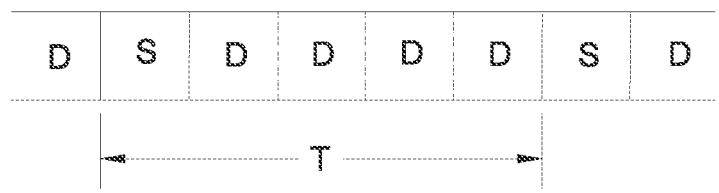
FIG. 5 is a view showing a sector structure of a track of a disk as a storage medium applied to the present invention.

As shown in FIG. 5, one servo sector T includes a servo information field S and a data field. The data field may include a plurality of data sectors D. Of course, one servo sector may include a single data sector D. The data sector D will be referred to as a sector. For example, the size of a sector may be 512 bytes.

Figure 6:
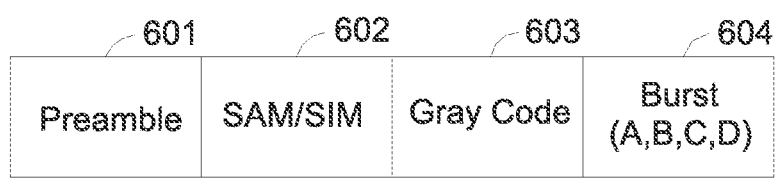
FIG. 6 is a view showing a structure of a service information field shown in FIG. 5.

Also, signals as illustrated in FIG. 6 are recorded to the servo information field S.

As shown in FIG. 6, a preamble 601, a servo synchronization indication signal 602, a gray code 603, and a burst signal 604 are written to the servo information field S.

The preamble 601 provides clock synchronization when reading servo information, and provides a predetermined timing margin by setting a gap before the servo sector. Also, the preamble 601 is used to determine a gain (not shown) of an automatic gain control (AGC) circuit.

The servo synchronization indication signal 602 consists of a servo address mark (SAM) and a servo index mark (SIM). The servo address mark is a signal that indicates a start of a sector, and the servo index mark is a signal that indicates a start of a first servo sector in a track.

The gray code 603 provides track information, and the burst signal 604 is used to control the head 16 to follow the center of the track 34. For example, the burst signal may include four patterns A, B, C, and D, and four burst patterns are combined to generate a position error signal used to control track following.

The disk 12 is divided into a maintenance cylinder area, which is inaccessible to a user, and a user data area, which is accessible to the user. The maintenance cylinder area may be referred to as a system area. Various information required to control the disk drive is stored in the maintenance cylinder area, as well as information required to perform the data writing method and method for managing cluster alignment in a write operation via a network according to the present invention. Specifically, address mapping information for converting a logical block address (LBA) into a virtual address (VA) based on a virtual band may be stored in the maintenance cylinder area. The address mapping information is also referred to as a mapping table or meta data. Moreover, information about a cluster unit size may be stored in the disk 12. The information about a cluster unit size may be set differently for each physical zone of the disk 12.

The head 16 moves across the surfaces of the disk 12 in order to read or write information in different tracks. A plurality of code objects used to realize various functions of the disk drive may be stored in the disk 12. For example, a code object for executing an MP3 player function, a code object for executing a navigation function, a code object for executing various video games, and the like, may be stored in the disk 12.

Referring again to FIG. 1A, the storage medium interface 140 is an element that enables the processor 110 to access the storage medium 150 in order to write and read information. In detail, the storage medium interface 140 in the storage device that is implemented as a disk drive includes a servo circuit controlling the head disk assembly 100 and a read/write channel circuit performing signal processing for data reading/writing.

The host interface 160 performs data transmission/reception to/from the host device 2000 such as a personal computer, a mobile device, etc., and may be an interface having various sizes, such as a serial advanced technology attachment (SATA) interface, a parallel advanced technology attachment (PATA) interface, or a universal serial bus (USB) interface.

The bus 170 transfers information between the elements of the storage device.

Next, a software operation system of a hard disk drive, which is an example of the storage device, will be described with reference to FIG. 2.

Figure 2:
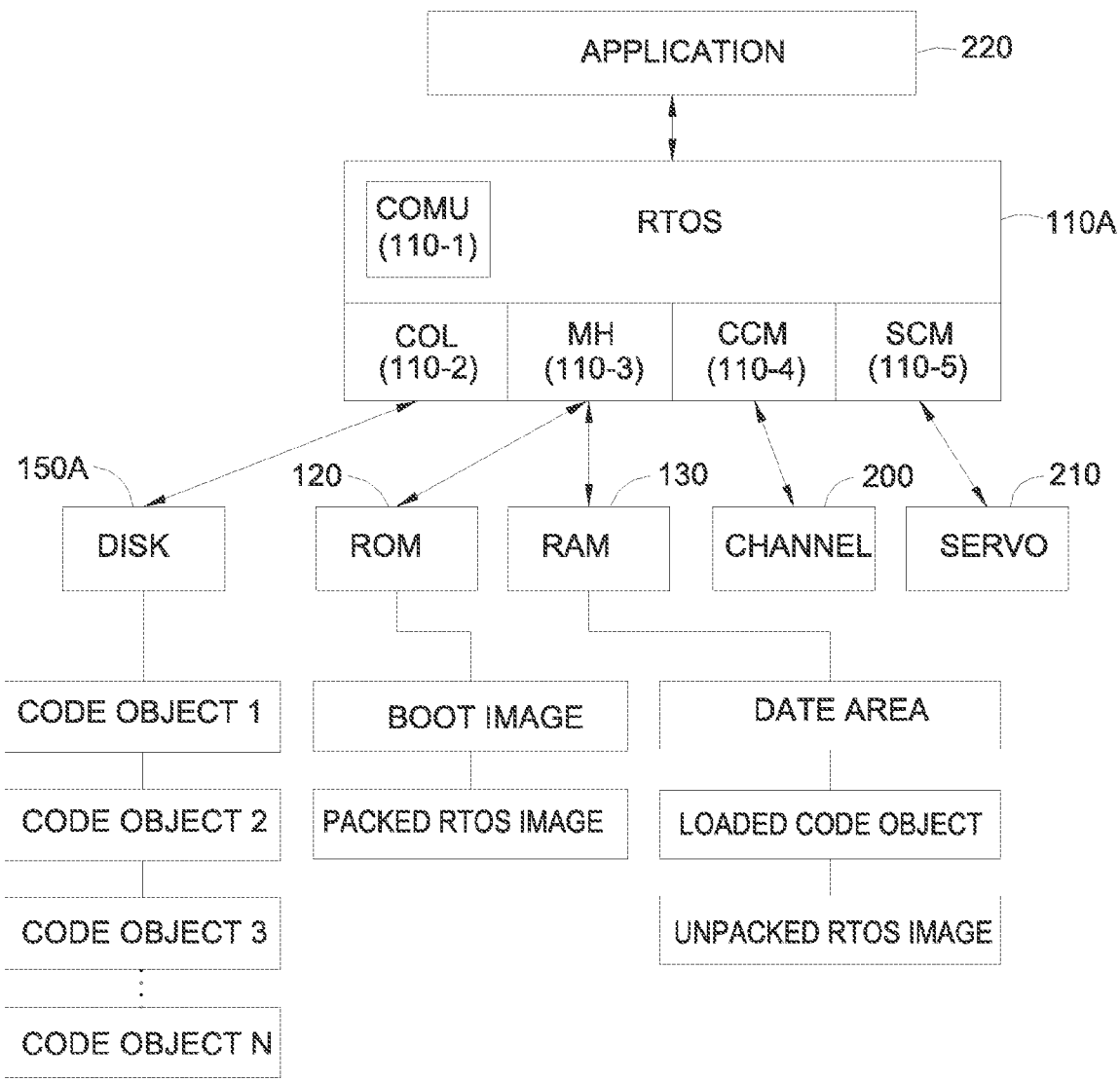
FIG. 2 is a diagram illustrating a software operation system of a storage device according to an embodiment of the inventive concept.

As shown in FIG. 2, a plurality of code objects 1 through N are stored in a disk 150A, which is a storage medium of the hard disk drive (HDD).

The ROM 120 stores a boot image and a packed real time operating system (RTOS) image.

The plurality of code objects 1 through N are stored in the disk 150A. The code objects stored in the disk may include not only code objects required for operating the disk drive but also code objects related to various functions that may be extended to the disk drive. In particular, code objects for executing the methods according to the flowcharts of FIGS. 15 to 20 and FIG. 30 are stored in the disk 150A. Obviously, the code objects for executing the methods according to the flowcharts of FIGS. 15 to 20 and FIG. 30 may also be stored in the ROM 120 instead of the disk 150A. Also, code objects performing various functions such as a MP3 player function, a navigation function, a video game function, or the like may also be stored in the disk 150A.

The RAM 130 reads the boot image from the ROM 120 while booting the disk drive, and an unpacked RTOS image is loaded to the RAM 130. Also, code objects required to operate a host interface stored in the disk 150A are loaded to the RAM 130. Obviously, a data area for storing data is also allocated in the RAM 130.

Circuits that are required to perform signal processing for data reading/writing are included in a channel circuit 200, and circuits required for controlling the head disk assembly 100 for performing data reading/writing operations are included in a servo circuit 210.

An RTOS 110A is a real time operating system program and is a multi-program operating system using a disk. In the RTOS 110A, real time multi-processing is performed as a foreground process having high priority, and batch processing is performed as a background process having low priority according to a task. Also, the RTOS 110A loads code objects from the disk and unloads code objects onto the disk.

The RTOS 110A manages a code object management unit (COMU) 110-1, a code object loader (COL) 110-2, a memory handler (MH) 110-3, a channel control module (CCM) 110-4, and a servo control module (SCM) 110-5 to perform tasks according to requested commands. The RTOS 110A also manages application programs 220.

In detail, the RTOS 110A loads code objects required for controlling the disk drive to the RAM 130 when booting the disk drive. Accordingly, after the booting is executed, the disk drive may be operated by using code objects loaded to the RAM 130.

The COMU 110-1 stores location information regarding locations to which code objects are written, and arbitrates a bus. Also, the COMU 110-1 stores information regarding priorities of performed tasks. In addition, the COMU 110-1 manages task control block (TCB) information required to execute tasks for code objects, and stack information.

The COL 110-2 loads the code objects stored in the disk 150A to the RAM 130 using the COMU 110-1 and unloads the code objects stored in the RAM 130 to the disk 150A. Accordingly, the COL 110-2 may load the code objects stored in the disk 150A used to execute the methods according to the flowcharts of FIGS. 15 through 20 and FIG. 30 to the RAM 130.

The RTOS 110A may execute the methods according to the flowcharts of FIGS. 15 through 20 and FIG. 30, which will be described below, by using the code objects loaded to the RAM 130.

The MH 110-3 performs writing or reading data to/from the ROM 120 and the RAM 130.

The CCM 110-4 performs channel controlling required for performing signal processing for data reading/writing, and the SCM 110-5 performs servo controlling including the head disk assembly for performing data reading/writing.

Figure 1B:
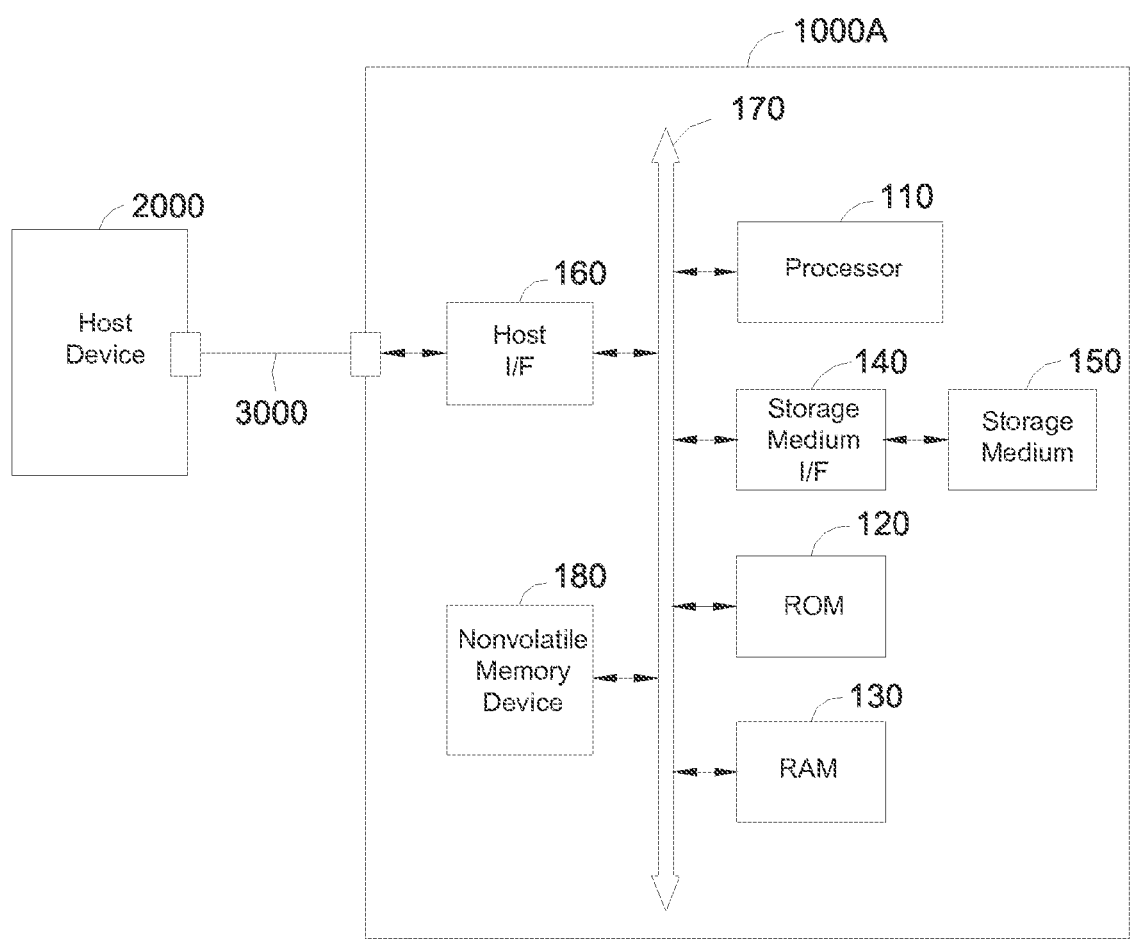
FIG. 1B is a block diagram of a computer system according to another embodiment of the inventive concept.

Next, FIG. 1B shows a block diagram of a computer system according to another embodiment of the inventive concept.

A storage device 1000B of the computer system shown in FIG. 1B further includes a nonvolatile memory device 180, in addition to the components of the storage device 1000A shown in FIG. 1A. The storage medium 150 in FIG. 1B may be implemented as a disk.

The nonvolatile memory device 180 may be implemented as a nonvolatile semiconductor memory device. For example, the nonvolatile memory device 180 may be a flash memory, a phase change RAM (PRAM), a ferroelectric RAM (FRAM), or a magnetic RAM (MRAM).

The nonvolatile memory device 180 may store some or all of the data to be stored in the storage device 1000B. For example, various information required for controlling the storage device 1000B may be stored in the nonvolatile memory device 180.

Also, the nonvolatile memory device 180 may store program codes and information for executing the methods according to the flowcharts of FIGS. 15 through 20 and FIG. 30. Concretely, a mapping table for converting a logical block address into a virtual address based on a virtual zone or virtual band may be stored in the nonvolatile memory device 180. If the mapping table is stored in the nonvolatile memory device 180, the storage device may load the mapping table stored in the nonvolatile memory device 180 to the RAM 130.

Repetitive descriptions of the same elements described previously described for the computer system of FIG. 1A will be omitted.

Figure 4A:
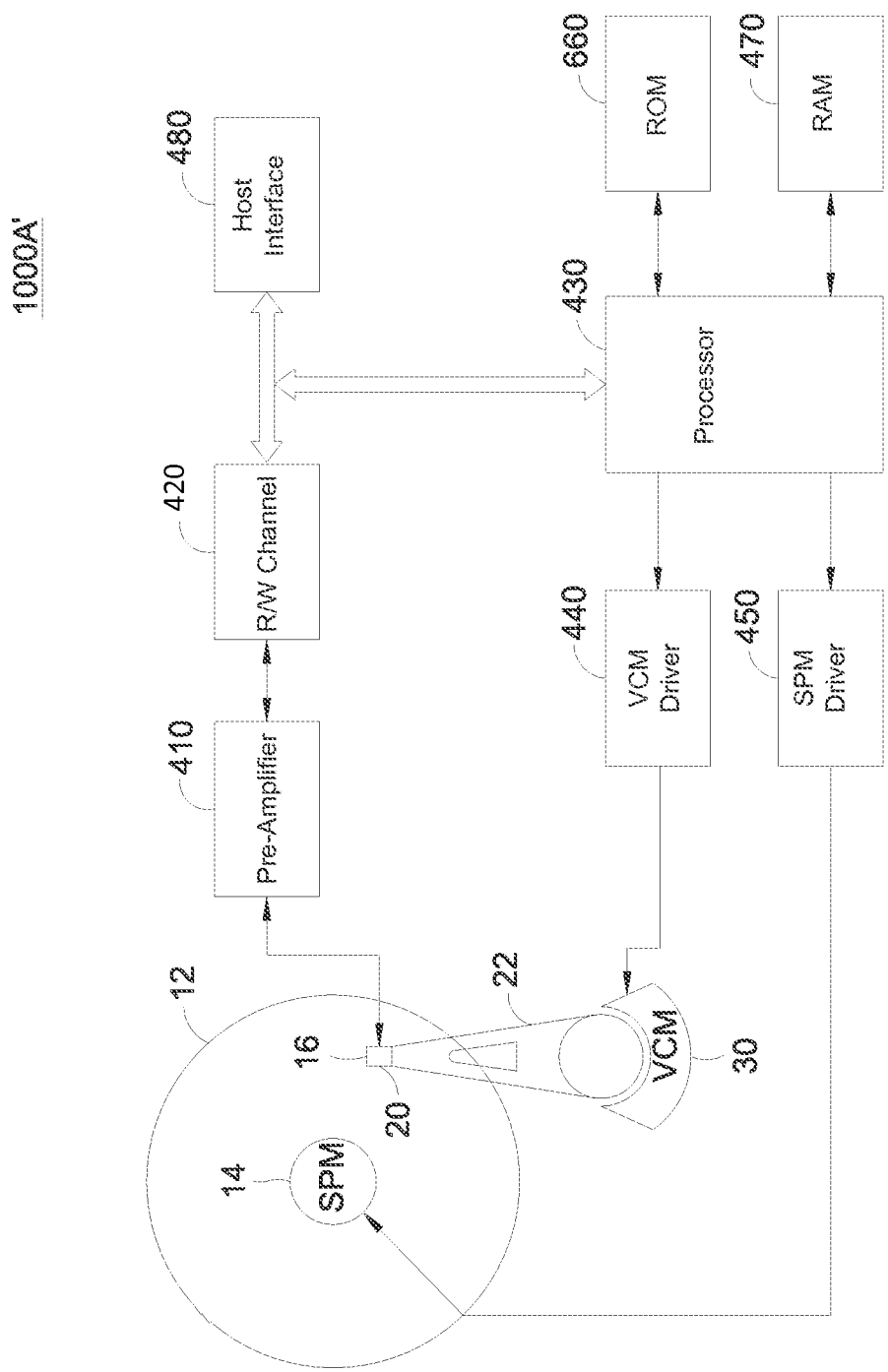
FIG. 4A is a view showing an electrical circuit configuration of a disk drive according to an embodiment of the inventive concept.

Next, FIG. 4A illustrates an electrical circuit configuration of a disk drive 1000A' as an example of the storage device shown in FIG. 1A according to an embodiment of the inventive concept.

As shown in FIG. 4A, a disk drive 1000A', according to an embodiment of the inventive concept includes a pre-amplifier 410, a Read/Write (R/W) channel 420, a processor 430, a Voice Coil Motor (VCM) driver 440, a Spindle Motor (SPM) driver 450, an ROM 460, a RAM 470, and a host interface 480.

The processor 430 may be a Digital Signal Processor (DSP), a microprocessor, a microcontroller, or the like. The processor 430 controls the R/W channel 420 to read information from the disk 12 or write information to the disk 12 according to a command received from the host device 2000 through the host interface 480.

The processor 430 is coupled to the VCM driver 440 which provides a driving current for driving the VCM 30. The processor 430 provides a control signal to the VCM driver 440 to control motion of the head 16.

The processor 430 is coupled to the SPM driver 450, which provides a driving current for driving a spindle motor (SPM) 14. The processor 430, upon being supplied with power, provides a control signal to the SPM driver 450 to rotate the SPM 14 at a target speed.

The processor 430 is also coupled to the ROM 460 and the RAM 470. The ROM 460 stores firmware and control data for controlling the disk drive. The ROM 460 also stores program codes and information for executing the methods according to the flowcharts of FIGS. 15 through 20 and FIG. 30. Alternatively, the program codes and information for executing the methods according to the flowcharts of FIGS. 15 through 20 and FIG. 30 may be stored in the maintenance cylinder area of the disk 12, instead of the ROM 460.

The RAM 470 loads the program codes stored in the ROM 460 or the disk 12 in an initialization mode under the control of the processor 430, and temporarily stores data received through the host interface 480 or data read from the disk 12.

The RAM 470 may be implemented by a Dynamic Random Access Memory (DRAM) or a Synchronous Random Access Memory (SRAM). The RAM 470 may be designed to operate in a Single Data Rate (SDR) or Double Data Rate (DDR) scheme.

The processor 430 may control the disk driver so as to execute the methods according to the flowcharts of FIGS. 15 through 20 and FIG. 30 using program codes and information stored in the ROM 460 or the maintenance cylinder area of the disk 12.

Figure 4B:
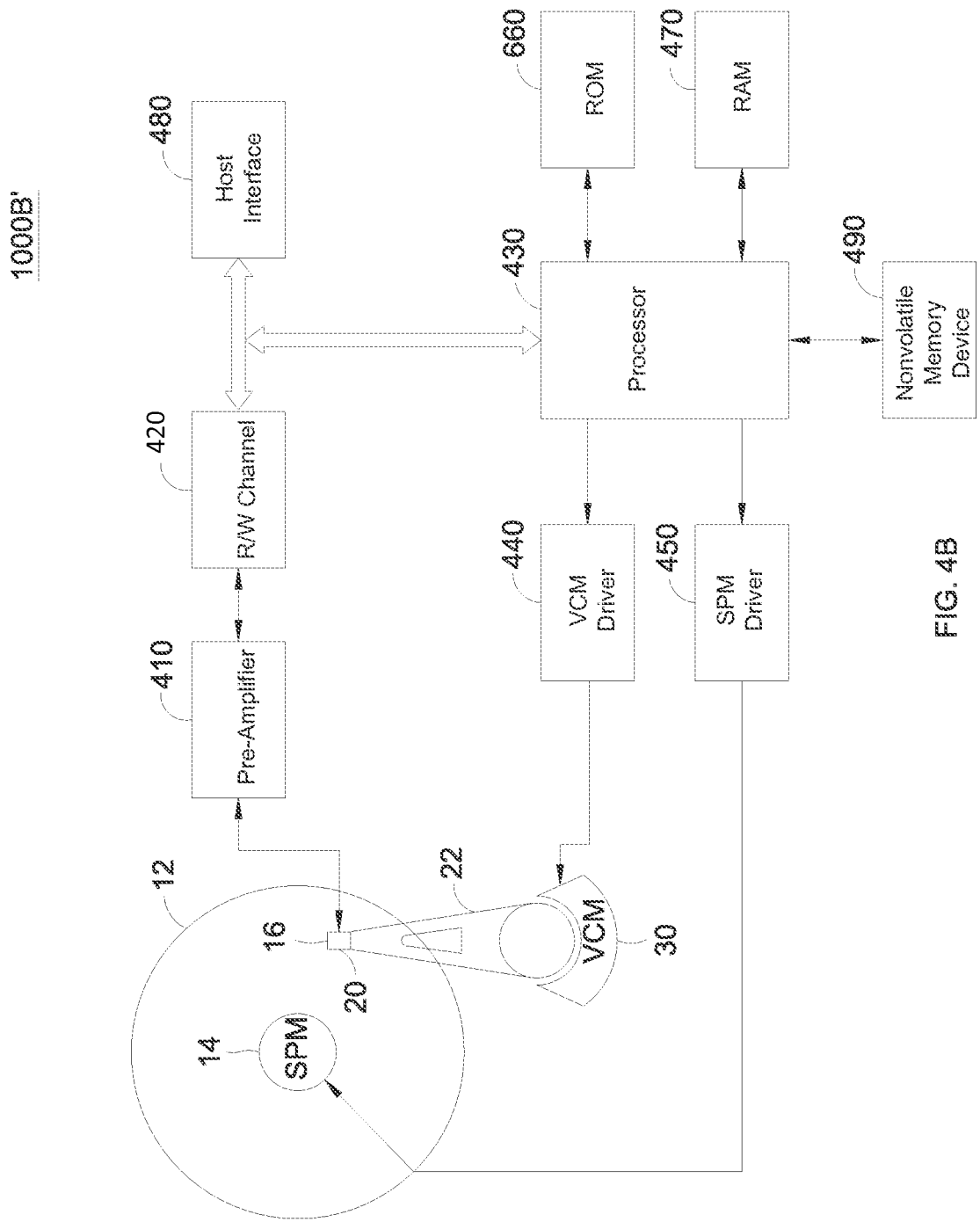
FIG. 4B is a view showing an electrical circuit configuration of a disk drive according to another embodiment of the inventive concept.

Next, FIG. 4B illustrates an electrical circuit configuration of a disk drive 1000B' as an example of the storage device shown in FIG. 1B according to an embodiment of the inventive concept.

The disk drive 1000B' shown in FIG. 4B further includes a nonvolatile memory device 490, in addition to the components of disk drive 1000A' shown in FIG. 4A. The nonvolatile memory device 490 may store some of the data to be stored in the disk drive 1000B'. For example, various information required for controlling the disk drive 1000B' may be stored in the nonvolatile memory device 490.

Also, the nonvolatile memory device 490 may store program codes and information for executing the methods according to the flowcharts of FIGS. 15 through 20 and FIG. 30. Concretely, a mapping table for converting a logical block address into a virtual address based on a virtual zone or virtual band may be stored in the nonvolatile memory device 490.

The processor 430 is also coupled to the ROM 460, the RAM 470, and the nonvolatile memory device 490. The ROM 460 stores firmware and control data for controlling the disk drive. The ROM 460 also stores program codes and information for executing the methods according to the flowcharts of FIGS. 15 through 20 and FIG. 30. Alternatively, the program codes and information for executing the methods according to the flowcharts of 15 through 20 and FIG. 30 may be stored in the maintenance cylinder area of the disk 12 or in the nonvolatile memory device 490, instead of the ROM 460.

The RAM 470 loads the program codes stored in the ROM 460, the disk 12, or the nonvolatile memory device 490 in an initialization mode under the control of the processor 430.

Repetitive descriptions of the same elements described previously described for the disk drive 1000A' of FIG. 4A will be omitted.

Next, data read and write operation, which are executed after searching a physical address of the disk corresponding to a logical block address designated by a read command or write command, will be described with reference to FIG. 4A or FIG. 4B.

Data read and write operations of the disk drive will be described.

In the data read mode, the disk drive amplifies an electrical signal sensed by the head 16 from the disk 12 through the pre-amplifier 410. Thereafter, in the R/W channel 420, a signal output from the pre-amplifier 410 is amplified by an automatic gain control circuit (not shown), which automatically varies a gain according to an amplitude of the signal. The amplified signal is converted into a digital signal, and then the digital signal is decoded, thereby detecting data. An error correction process is performed on the detected data by using a Reed Solomon (RS) code as an error correction code at the processor 430. Then error corrected data is converted into stream data for transmission to the host device 2000 through the host interface 480.

In the data write mode, the disk drive receives data from the host device 2000 through the host interface 480, and adds an error correction symbol based on the RS code to the data through the processor 430. The disk drive suitably performs coding for a writing channel through the R/W channel 420, and then writes the data in the disk 12 through the head 16 with a writing current amplified by the pre-amplifier 410.

Now, an operation for the processor 430 to execute the methods according to the flowcharts of FIGS. 15 through 20 and FIG. 30 by using the program codes and information loaded to the RAM 470 will be described.

First of all, a shingle write method, which is a new writing method, suggested to increase the recording density of the disk drive, which is a type of storage device according to the present invention, will be described.

Figure 7:
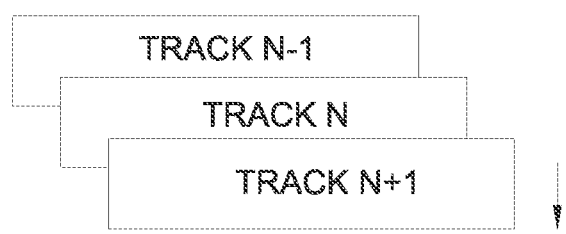
FIG. 7 conceptually illustrates the configuration of tracks caused by a flux generated in a shingle write method according to an embodiment of the inventive concept.

The shingle write method is a writing method in which data is written only in one direction as tracks on a disk are overwritten as if shingles are stacked. That is, as shown in FIG. 7, in the shingle write method, assuming that data is written only in the arrow direction, an (N−1)th track is partially overwritten when an Nth track adjacent to the (N−1)th track is written, and the Nth track is partially overwritten when the (N+1)th track adjacent to the Nth track is written, thereby increasing the TPI (Track Per Inch) characteristic, which is the radial recording density of a storage medium.

Figure 8:
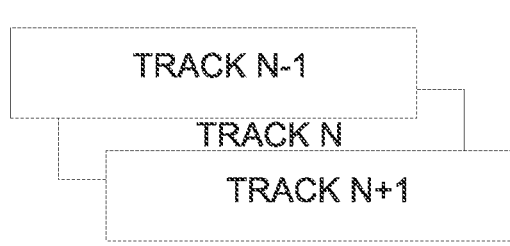
FIG. 8 conceptually illustrates the configuration of tracks caused by an adjacent track interference phenomenon in a shingle write method according to an embodiment of the inventive concept.

The shingle write method has to satisfy the restriction that the (N−1)th track cannot be written after writing the Nth track because a flux is always generated only in one direction. As shown in FIG. 8, if the (N−1)th track in the direction opposite to the shingle write direction is written after writing the Nth track, the Nth track is erased due to an adjacent track interference (ATI) effect.

Accordingly, to solve this problem, there is a need for a technique of dynamically allocating a new disk address for a logical block address (LBA) provided from a host so as to always perform writing only in either one of the inner and outer circumferential directions of the disk.

The present invention provides a disk accessing method, which uses an existing LBA as it is by using a virtual address in the process of converting the existing LBA into a cylinder head sector (CHS), i.e., a physical address of a disk drive, and satisfies the condition that the shingle write direction in the disk drive is limited to only one direction.

Figure 9:
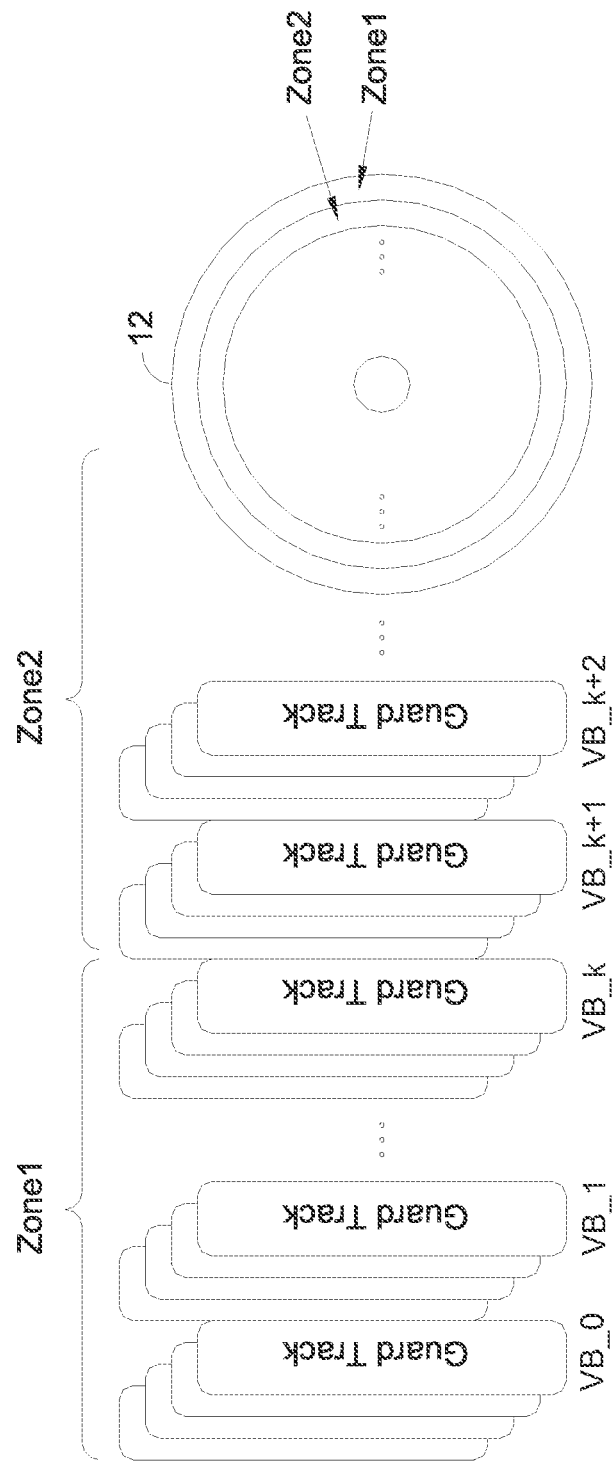
FIG. 9 is a view illustrating the configurations of physical zones and virtual bands for a storage medium according to an embodiment of the inventive concept.

Referring to FIG. 9, the configurations of a zone and virtual bands for realizing the accessing method suggested in the present invention will be described.

A storage area of the disk 12 is divided into a plurality of physical zones. The TPI (tracks per inch), i.e., recording density, and BPI (bits per inch) for each physical zone may be differently set. Each physical zone includes a plurality of virtual bands, and each virtual band is defined as a set of consecutive M tracks to be overwritten. Also, a guard track is arranged between the virtual bands to avoid overwriting between the virtual bands. Referring to FIG. 9, K virtual bands VB_1 to VB_K are arranged in physical zone 1. That is, a virtual band is defined as a segment of a unit size of a physical storage space of a storage medium. Data is sequentially written on the tracks included in a virtual band in either one of the inner and outer circumferential directions of the disk to generate address mapping information.

Next, the structure of allocating logical bands and virtual bands for each zone will be described with reference to FIG. 10.

Figure 10:
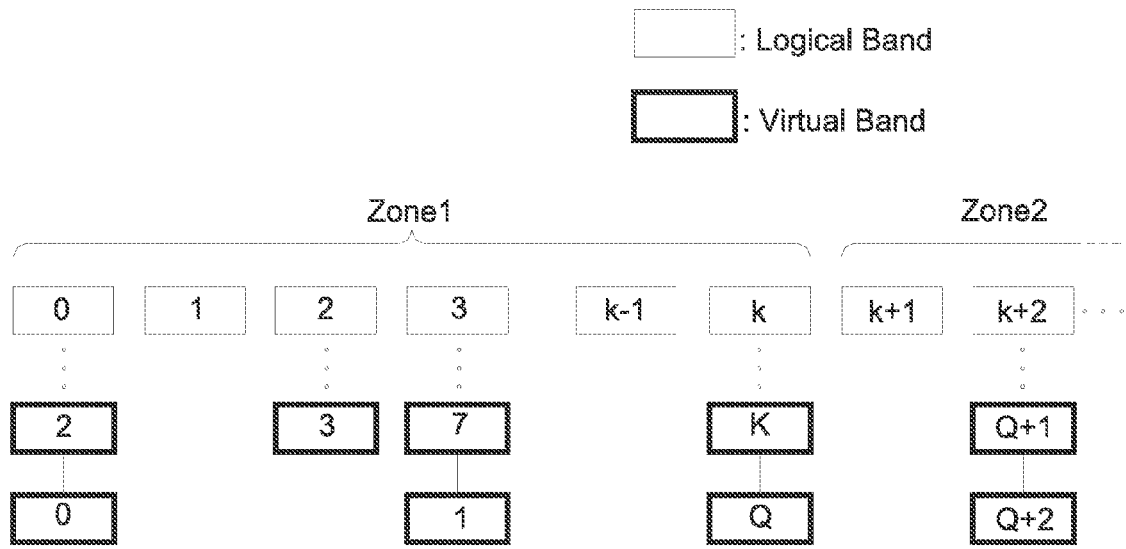
FIG. 10 is a view illustrating the structure of virtual bands allocated to logical bands for each physical zone of a storage medium according to an embodiment of the inventive concept'

FIG. 10 is a view schematically showing the structure of allocating virtual bands VB to logical bands LB for each physical zone of a storage medium according to an embodiment of the inventive concept.

As shown in FIG. 10, virtual bands are allocated to logical bands in order to perform an actual writing operation in a physical zone of a storage medium. Physical zone 1 of the storage medium may consist of K logical bands. A logical band is defined as a set of consecutive logical block addresses in units of a first size. That is, a logical band refers to a set of consecutive writable logical block addresses.

For example, assuming that the range of logical block addresses of physical zone 1 consists of 1,000 LBAs of 0 through 999, and each of the logical bands belonging to physical zone 1 is defined as a set of 100 LBAs, the number of logical bands included in physical zone 1 is 10.

The number of virtual bands is set to Q (Q>K), which is more than the number of logical bands. The virtual bands are defined as the segments of the physical storage device of the storage in units of a second size. That is, if the storage medium is a disk, a virtual band is defined as a set of M tracks to be overwritten.

Virtual bands not allocated to logical bands may be referred to as reserved virtual bands. In other words, storage areas corresponding to the virtual bands not allocated to the logical bands may be referred to as reserved areas. Reserved virtual band information is stored in a free queue to be explained in FIG. 14 below.

Now, an operation for a storage device to perform access by using a logical band will be described.

Figure 11:
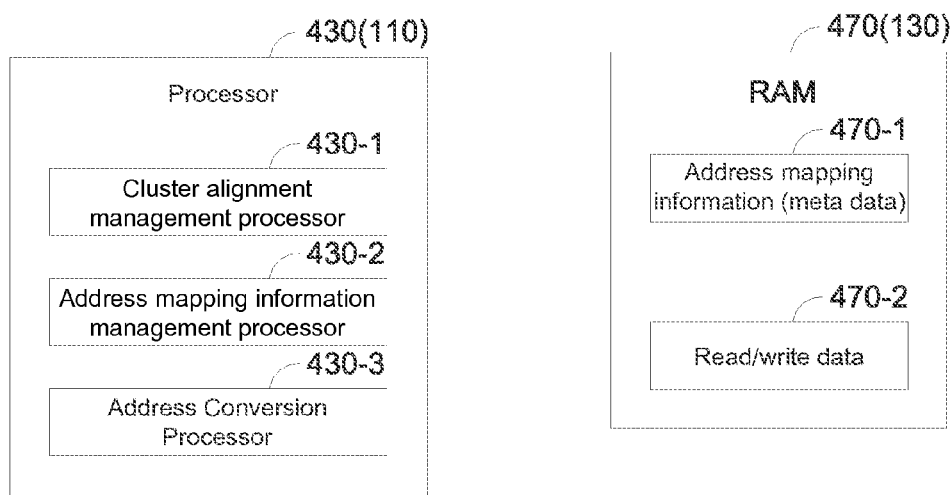
FIG. 11 is a detailed block diagram of the processor and RAM of a storage device according to an embodiment of the inventive concept.

FIG. 11 shows a detailed block diagram of the processor 110 and RAM 130 of the storage device illustrated in FIGS. 1A and 1B or the processor 430 and RAM 470 of the disk driver illustrated in FIGS. 4A and 4B according to an embodiment of the inventive concept. For convenience of description, FIG. 11 will be explained with reference to the disk drive of FIGS. 4A and 4B.

As shown in FIG. 11, the processor 430 includes a cluster alignment management processor 430-1, an address mapping information management processor 430-2, and an address conversion processor 430-3. Also, the RAM 470 stores address mapping information 470-1, and data read from the disk 12 or data to be written to the disk 12 is stored in the read/write data area 470-2. The address mapping information management processor 430-2 executes a process for managing address mapping information. Specifically, when power is supplied to the disk drive, the address mapping information management processor 430-2 loads the address mapping information 470-1 stored in the disk 12 onto the RAM 470. That is, the address mapping information management processor 430-2 reads the address mapping information 470-1 from the disk 12 and stores it in the RAM 470.

The address mapping information 470-1 may comprise information for converting a logical block address into a physical address of the storage medium by using a virtual address. For example, the address mapping information may be mapping table information that represents the allocation relationship between a logical band and virtual bands and the allocation relationship between logical block addresses and virtual addresses in a virtual band allocated to a logical band. The address mapping information is also referred to as meta data.

The address mapping information 470-1 may be configured to retrieve a virtual address based on LBA. The virtual address may be defined based on the physical address of a storage medium. If the storage medium is a disk, the virtual address may be defined based on the physical address of a sector. Moreover, the virtual address of the disk may be defined based on CHS (Cylinder Header Sector). Besides, the virtual address of the disk may be defined based on a virtual zone or physical zone, a virtual band, a track, and a sector. The address mapping information 470-1 may be generated while data is being sequentially written on the tracks of the disk included in a virtual band in either one of the inner and outer circumferential directions according to a shingle write method.

The address mapping information 470-1 may include information representing the allocation structure of logical bands and virtual bands for each physical zone. That is, the address mapping information 470-1 may include information representing the mapping structure of virtual bands allocated and mapped to logical bands for each physical zone as shown in FIG. 10.

As shown in FIG. 21, the address mapping information may include the categories of logical band number LB NO, virtual band number VB NO, and last virtual address number LA VA accessed by a virtual band.

Referring to FIG. 21, it can be seen that virtual band numbers 2 and 0 are allocated to logical band number 0, the last virtual address accessed by virtual band number 2 is 199, and the last virtual address accessed by virtual band number 0 is 94.

For example, if the size of a virtual band is set to 200 sectors, and virtual addresses 0 to 199 are set for each virtual band, the virtual addresses including the last virtual address 199 are allocated to virtual band number 2, and this shows that there exists no virtual address that can be newly allocated. Also, when a write command for an LBA included in the logical band 0 is received, address mapping information is updated such that virtual address 95, obtained by adding 1 to the last virtual address accessed by the virtual band number 0, is mapped to an LBA designated by the write command.

Figure 22:
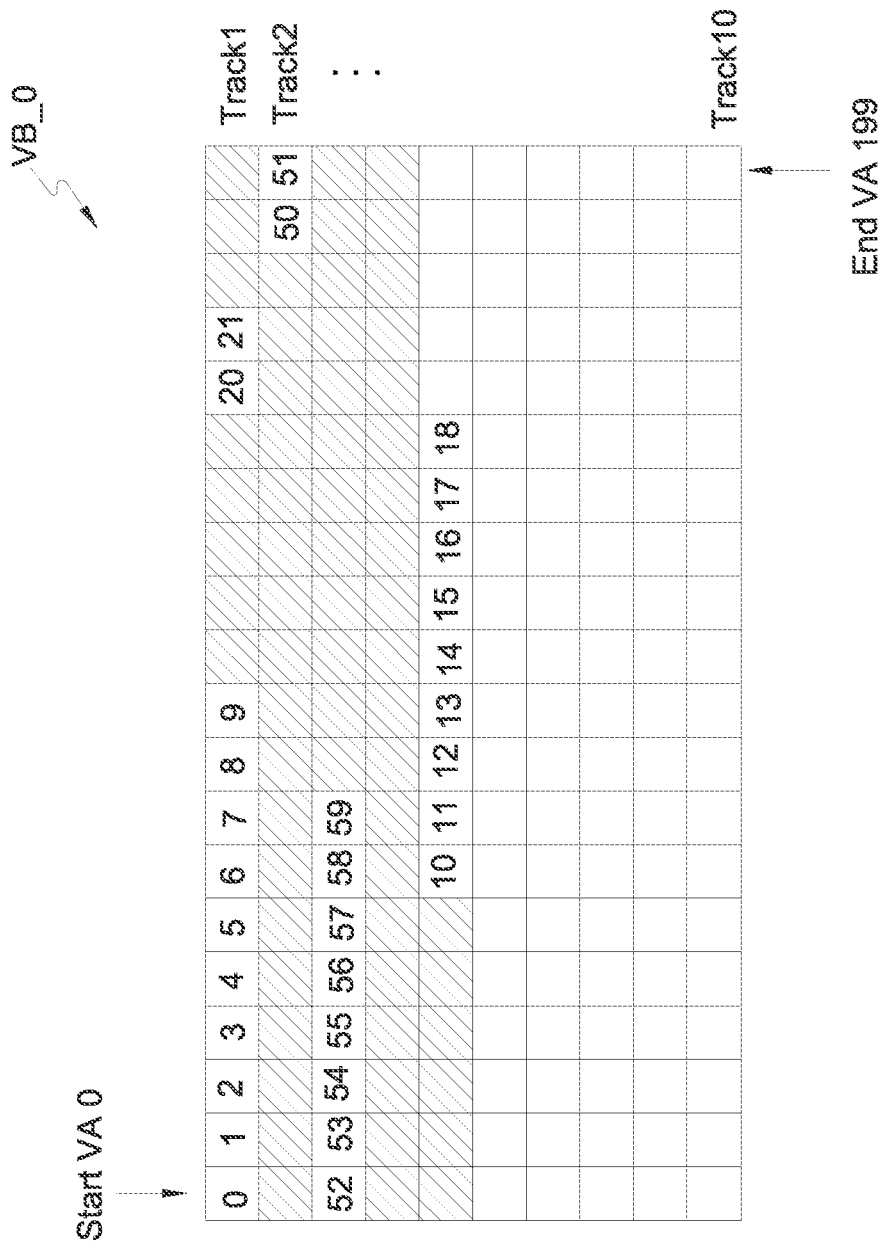
FIG. 22 is a conceptual diagram showing a structure of mapping virtual addresses VA to LBAs in virtual band number 0.

FIG. 22 illustrates an example of a structure in which virtual addresses (VA) are mapped to LBAs in the virtual band 0 (VB_0) allocated to the logical band number 0.

Referring to FIG. 22, the virtual band (VB_0) includes virtual addresses 0 to 199, and each of the virtual addresses is allocated to a sector. Accordingly, referring to FIG. 22, a unit virtual band includes 200 sectors. A horizontal line shows the sectors included in one track. As shown in FIG. 22, 20 sectors are included in one track. 20 sectors included in track 1 are designated by virtual addresses (VA) 0 to 19, respectively. In the same manner, 20 sectors included in track 10 are designated by Vas 180 to 199, respectively.

As shown in FIG. 22, LBAs 0 to 9 are respectively allocated to VAs 0 to 9, LBAs 20 and 21 are respectively allocated to VAs 15 and 16, LBAs 50 to 59 are respectively allocated to VAs 38 to 47, and LBAs 10 to 18 are respectively allocated to Vas 86 to 94. VAs 10 to 14, 17 to 37, and 48 to 85 represent invalid virtual addresses, and VAs 95 to 199 represent valid virtual addresses that are not allocated. The invalid virtual addresses refer to the previous virtual addresses corresponding to updated LBAs.

Address mapping information about the virtual band 0 (VB_0) shown in FIG. 22 can be generated as shown in FIG. 23A, for example.

FIG. 23A is a mapping table that simply shows the mapping relationship of VAs corresponding to respective LBAs allocated in VB_0. The mapping table having the structure shown in FIG. 23A has the disadvantage of large data volume because it merely lists VAs corresponding to respective LBAs.

To make up for this disadvantage, there is suggested a method that generates address mapping information by combining sequentially increasing LBAs and VAs into a group.

That is, newly suggested address mapping information indicates a group of sequentially increasing LBAs and VAs by the starting LBA, starting VA, and number (SCN) of sequentially increasing sectors.

Referring to FIG. 22, the LBA sequentially increases from 0 to 9 with increasing VAs 0 to 9, the LBA sequentially increases from 20 to 21 with increasing VAs 15 and 16, the LBA sequentially increases from 50 to 59 with increasing VAs 38 to 47, and the LBA sequentially increases from 10 to 18 with increasing VAs 86 to 94.

As above, mapping information about the group of LBAs from 0 to 9 and VAs from 0 to 9 can be represented by the address mapping format of (LBA, SCN VA) as (0, 10, 0).

In the same manner, for the group of sequentially increasing LBAs 20 and 21 with increasing VAs 15 and 16, the starting LBA is 20, the starting VA is 15, and the number of sequentially increasing sectors is 2. Thus, (LBA, SCN, VA) can be represented by (20, 2, 15). For the group of sequentially increasing LBAs 50 to 59 with increasing VAs 38 to 47, (LBA, SCN, VA) can be represented by (50, 10, 38), and for the group of sequentially increasing LBAs 10 to 18 with increasing VAs 86 to 94, (LBA, SCN, VA) can be represented by (10, 9, 86). Accordingly, for an area in which logical block addresses and the corresponding virtual addresses sequentially increase, it is possible to generate mapping information as key information.

Figure 23B:
FIG. 23B illustrates another example of address mapping information about virtual band number 0 shown in FIG. 22.

To sum up, the address mapping information as shown in FIG. 23B can be generated. It can be seen that the address mapping information shown in FIG. 23B is simpler and smaller in data volume than the address mapping information shown in FIG. 23A.

For virtual bands allocated to a logical band, address mapping information about each virtual band can be generated in the manner shown in FIG. 23B.

Referring again to FIG. 11, the RAM 470 may store address mapping information 470-1 for each zone, the address mapping information 470-1 including mapping information representing the allocation relation between a logical band and virtual bands and the last virtual address accessed by a virtual band, as shown in FIG. 21, and mapping information representing VAs corresponding to LBAs in a virtual band allocated to a logical band, as shown in FIG. 23B.

The address mapping information management processor 430-2 modifies the address mapping information 470-1 stored in the RAM 470 based on a write command. That is, the address mapping information management processor 430-2 adds to the address mapping information 470-1, information about virtual bands newly allocated to a logical band by a write command or information about virtual addresses added corresponding to LBAs in an allocated virtual band. Accordingly, the address mapping information 470-1 stored in the RAM 470 is updated each time a write command is executed. Upon receiving an end system command, the address mapping information management processor 430-2 can read the address mapping information 470-1 stored in the RAM 470 and write to the disk 12. Therefore, updated address mapping information 470-1 is stored in the disk 12.

The cluster alignment management processor 430-1 performs the operation of modifying an area designated by a write command and data to be written so that data is aligned and written to the storage medium in units of at least one cluster based on information about a cluster unit size read from the storage medium including the disk 12. A detailed operation of the cluster alignment management processor 430-1 will be described with reference to FIG. 12. A cluster unit is a unit of storage for storing data in the storage device, and may be set to an initial value.

Figure 12:
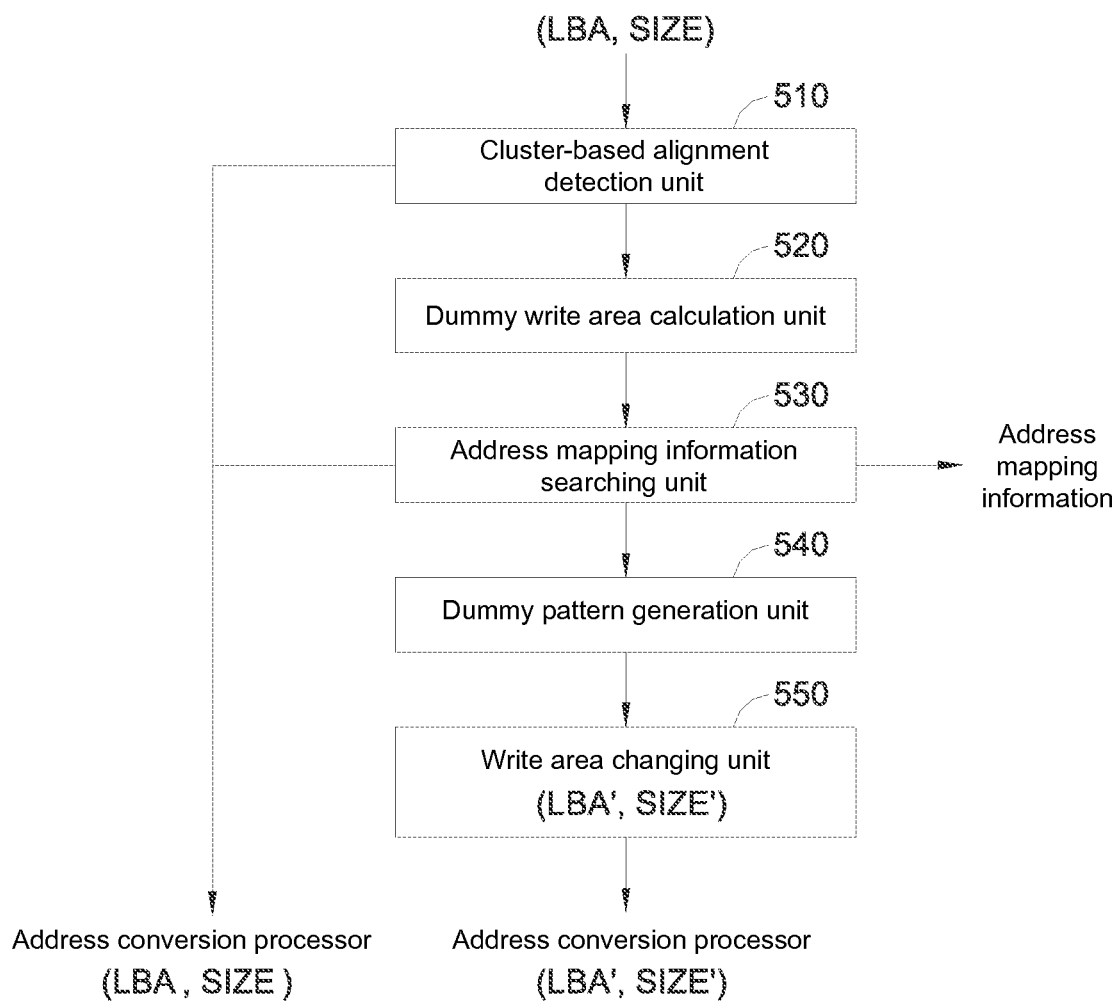
FIG. 12 is a detailed block diagram of a cluster alignment management processor shown in FIG. 11.

A detailed configuration of the cluster alignment management processor 430-1 is illustrated in FIG. 12.

As shown in FIG. 12, the cluster alignment management processor 430-2 includes a cluster-based alignment detection unit 510, a dummy write area calculation unit 520, an address mapping information searching unit 530, a dummy pattern generation unit 540, and a write area modifying unit 550.

The cluster-based alignment detection unit 510 performs the process of detecting a cluster-based alignment state for a first area designated by a write command.

In detail, a cluster-based alignment state for the first area is detected as follows.

First of all, the start position and end position of the first area are calculated based on (LBA, SIZE) information included in the write command. Here, LBA denotes a logical block address representing the start position of the first area, and SIZE denotes the number of sectors of the first area. That is, SIZE represents the range of LBAs included in the first area. Accordingly, the end position of the first area is a logical block address having a value of (LBA+SIZE−1). For example, if (LBA, SIZE) is (100, 10), the write start position is LBA 100, and the end position is LBA 109.

For example, if the sector size of the disk 12 is 512 bytes, and the cluster unit size is 4K bytes, the cluster unit size is 8 sectors. In this case, the start position of each cluster in the disk 12 will be LBA 0, LBA 8, LBA 16, LBA 24, . . . . That is, the start positions of clusters are LBAs having multiples of 8. Also, the end positions of clusters are LBAs obtained by subtracting 1 from multiples of 8. In other words, the end positions of clusters have a value of 7, which is the remainder of an LBA when divided by 8.

Accordingly, if the LBA value, among the (LBA, SIZE) information included in the write command, corresponds to multiples of the number of sectors corresponding to a cluster unit size, the first area A1 is detected as being aligned with the start position of a cluster. Also, if the remainder of the (LBA+SIZE−1) value when divided by the number of sectors corresponding to the cluster unit size, the first area A1 is detected as being aligned with the end position of a cluster. In another method, if the (LBA+SIZE) value corresponds to multiples of the number of sectors corresponding to the cluster unit size, the first area A1 is detected as being aligned with the end position of a cluster.

Figure 24:
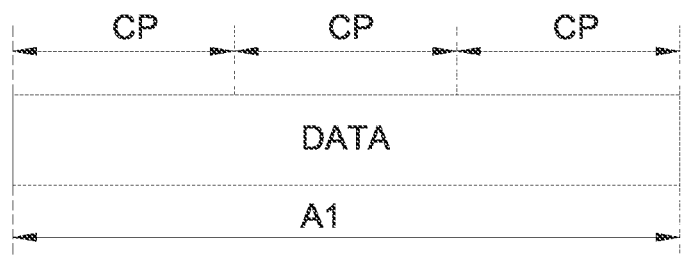
FIG. 24 is a conceptual diagram of a write area in which both the start and end positions of a first area designated by a write command are aligned in units of clusters.
Figure 25A:
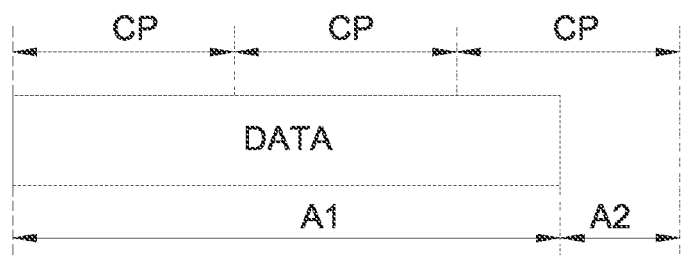
FIG. 25A is a conceptual diagram of a write area in which the start position of the first area designated by the write command is aligned in units of clusters and the end position of the first area is not aligned in units of clusters.
Figure 26A:
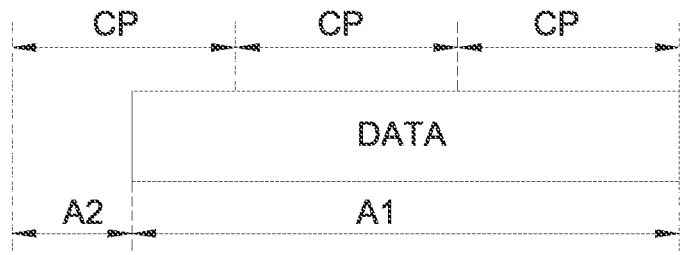
FIG. 26A is a conceptual diagram of a write area in which the start position of the first area designated by the write command is not aligned in units of clusters and the end position of the first area is aligned in units of clusters.
Figure 27A:
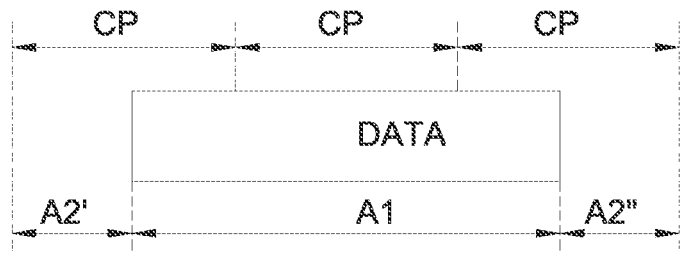
FIG. 27A is a conceptual diagram of a write area in which both the start and end positions of the first area designated by the write command are not aligned in units of clusters.

FIG. 24 shows an example in which the start position and end position of the first area A1 to which data DATA is to be written in response to a write command are aligned in units of clusters. Here, CP denotes a cluster unit size, which can be represented by the number of sectors. FIG. 25A shows an example in which the start position of the first area A1 to which data is written in response to a write command is aligned in units of clusters but the ending position thereof is not aligned in units of clusters. FIG. 26A shows an example in which the start position of the first area A1 to which data is written in response to a write command is not aligned in units of clusters but the end position thereof is aligned in units of clusters. FIG. 27A shows an example in which both the start and end positions of the first area A1 to which data is written in response to a write command are not aligned in units of clusters.

The dummy write area calculation unit 520 performs the process of calculating address information for a second area A2 not included in the first area A1 within the clusters corresponding to the first area designated by the write command based on the detection result of the cluster-based alignment detection unit 510.

First of all, as shown in FIG. 24, if the start position and end position of the first area A1 to which data DATA is to be written in response to a write command are aligned in units of clusters, the address information for the second area A2 is not calculated. In this case, there is no need to calculate the address information for the second area A2.

For example, the dummy write area calculation unit 520 may be designed to perform the process of calculating the address information for the second area A2 provided that the start position of the first area A1 is aligned in units of clusters and the end position of the first area A1 is not aligned in units of clusters. In this case, the address information for the second area A2 is calculated only when detection is performed as shown in FIG. 25A, among FIGS. 24, 25A, 26A, and 27A. If the start position of the first area A1 to which data DATA is to be written in response to a write command is not aligned in units of clusters, the first area A1 is very likely to be an MFT file, a boot sector, or a boot record. Accordingly, there is a high possibility that a write command or read command may be issued in units of sectors, and hence the dummy write area calculation unit 520 may be designed such that alignment is not performed in units of clusters.

In another example, the dummy write area calculation unit 520 may be designed to perform the process of calculating the address information for the second area A2 if the starting or end position of the first area A1 is not aligned in units of clusters. In this case, the address information for the second area A2 is calculated only when detection is performed as shown in FIGS. 25A, 26A, and 27A, among FIGS. 24, 25A, 26A, and 27A.

Now, the operation of calculating the address information for the second area A2 will be described in detail with reference to FIGS. 25A, 26A, and 27A.

First of all, if the first area A1 to be written is designated by a write command, as shown in FIG. 25A, the dummy write area calculation unit 520 determines that the address information for the second area A2 is the address information for the first and second block addresses, which is obtained by adding the first logical block address to a remainder of the size information when divided by a cluster unit (CP) size and subtracting 1 from the first logical block address obtained by adding the size information to the logical block address LBA designated by the write command.

For example, if (LBA, SIZE) information included in the write command is (1000, 20) and the cluster unit size is 8 sectors, CP is 8. In this case, LBA 1020 having a value of (LBA+SIZE) is the first logical block address, which is the start address of the second area A2. Also, a remainder of the size information of 20 when divided by the cluster unit (CP) size of 8 is 4, and therefore the second logical block address, which is the end address of the second area A2, is LBA 1023, which is an LBA (1020+4−1). That is, the address information for the second area A2 is LBA 1020 through LBA 1023.

Next, if the first area A1 to be written is designated by the write command as shown in FIG. 26A, the dummy write area calculation unit 520 obtains a remainder X1 of the logical block address LBA designated by the write command when divided by the cluster unit (CP) size, determines the starting address of the second area A2 as having an (LBA−X1) value, and determines the end address of the second area A2 as having an (LBA−1) value.

For example, if (LBA, SIZE) information included in the write command is (1004, 20) and the cluster unit size is 8 sectors, CP is 8. In this case, a remainder X1 of 1004 when divided by 8 is 4. Accordingly, the starting address of the second area A2 is 1000, which is (1004−4), and the end address of the second area A2 is 1003, which is (1004−1). Therefore, the address information for the second area A2 is LBA 1000 through LBA 1003.

Next, if the first area A1 to be written is designated by a write command, as shown in FIG. 27A, the dummy write area calculation unit 520 calculates address information for two second areas A2' and A2". That is, the dummy write area calculation unit 520 obtains a remainder X1 of the logical block address LBA designated by the write command when divided by the cluster unit (CP) size, determines the starting address of the second area A2' as having an (LBA−X1) value, and determines the end address of the second area A2' as having an (LBA−1) value.

Also, a value obtained by adding SIZE information to the logical block address LBA designated by the write command may be determined as the starting address of the second area A2", and a value obtained by adding the starting address of the second area A2" to a remainder of the (SIZE+X1) value when divided by the cluster unit (CP) size and subtracting 1 may be determined as the end address of the second area A2".

For example, if (LBA, SIZE) information included in the write command is (1004, 16) and the cluster unit size is 8 sectors, CP is 8. In this case, a remainder X1 of 1004 when divided by 8 is 4. Accordingly, the starting address of the second area A2 is 1000, which is (1004−4), and the end address of the second area A2' is 1003, which is (1004−1). Therefore, the address information for the second area A2' is LBA 1000 through LBA 1003. Moreover, LBA 1020 equal to (LBA+SIZE) is the first logical block address, which is the starting address of the second area A2."

Also, the remainder of the (SIZE+X1) value of 20 when divided by the cluster unit (CP) size of 8 is 4, and therefore the second logical block address, which is the end address of the second area A2", is LBA 1023 equal to LBA (1020+4−1). That is, the address information for the second area A2' is LBA 1020 through LBA 1023.

The above-described dummy write area calculation unit 520 is able to calculate the address information for the second area not included in the first area within the clusters corresponding to the first area designated by the write command based on the detection result of the cluster-based alignment detection unit 510 in the above-mentioned manner.

Next, the address mapping information searching unit 530 determines whether or not the address for the second area calculated by the dummy write area calculation unit 520 exists in the address mapping information 470-1 stored in the RAM 470. For reference, if the address for the second area calculated by the dummy write area calculation unit 520 exists in the address mapping information 470-1, this means that valid data is already stored in a physical zone of the disk 12 corresponding to the second area A2.

If the address for the second area calculated by the dummy write area calculation unit 520 does not exist in the address mapping information 470-1 stored in the RAM 470, the dummy pattern generation unit 540 generates a dummy pattern for writing to the second area and adds it to write data of the RAM 470. If the address for the second area calculated by the dummy write area calculation unit 520 exists in the address mapping information 470-1 stored in the RAM 470, no dummy pattern for the second area is generated. The dummy pattern may consist of consecutive 0s. Also, the dummy pattern may be configured as a specific pattern which is distinguished from data.

Next, the write area modifying unit 550 modifies a write area designated by a write command so as to include the second area with a dummy pattern. That is, (LBA, SIZE) information included in the write command is modified to (LBA', SIZE') so as to include the first area and the second area.

When the first area A1 to be written is designated by the write command as shown in FIG. 25A, when the LBA information included in the write command is not changed but only the SIZE information is modified so as to be increased by the size of the second area A2. For example, if the (LBA, SIZE) information included in the write command is (1000, 20), the modified (LBA, SIZE') information is (1000, 24).

When the first area A1 to be written is designated by the write command, the LBA information as shown in FIG. 26A, the LBA information included in the write command is modified to be decreased by the size of the second area A2 and the SIZE information is modified to be increased by the size of the second area A2. For example, if the (LBA, SIZE) information included in the write command is (1004, 20), the modified (LBA', SIZE') information is (1000, 24).

When the first area A1 to be written is designated by the write command, the LBA information as shown in FIG. 27A, the LBA information included in the write command is modified to be decreased by the size of the second area A2' and the SIZE information is modified to be increased by the size of the sum (A2'+A2") of the two second areas. For example, if the (LBA, SIZE) information included in the write command is (1004, 16), the modified (LBA', SIZE') information is (1000, 24).

The (LBA' SIZE') information modified by the write area modifying unit 550 is input into the address conversion processor 430-3.

If the address information for the second area A2 is not calculated based on the detection result of the cluster-based alignment state, or the address information for the second area A2 does not exist in the address mapping information, the (LBA, SIZE) information included in the write command is not modified but input into the address conversion processor 430-3.

The address conversion processor 430-3 performs the process of converting an LBA for a writing area into physical location information of the storage medium using a virtual band and a virtual address, based on the (LBA, SIZE) or (LBA', SIZE'), which is information about a writing position, included in the write command. A detailed configuration of the address conversion processor 430-3 is illustrated in FIG. 13.

Figure 13:
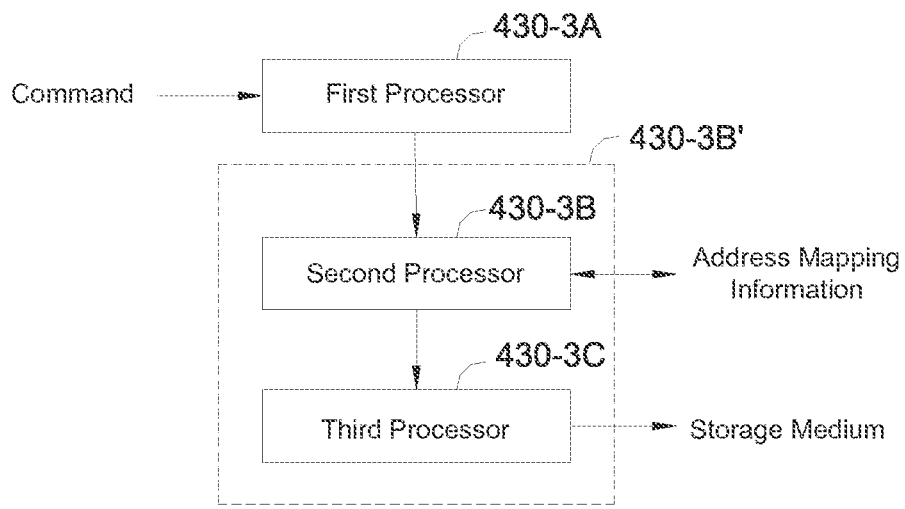
FIG. 13 is a detailed block diagram of an address conversion processor shown in FIG. 11.

As shown in FIG. 13, the address conversion processor 430-3 may include a first processor 430-3A, a second processor 430-3B, and a third processor 430-3C.

The first processor 430-3A performs the operation of extracting an LBA for a writing position from (LBA, SIZE)

information included in a write command or modified (LBA', SIZE') information included in the write command.

The second processor 430-3B performs the operation of converting the LBA extracted by the first processor 430-3A into a virtual address. That is, the second processor 430-3B performs the operation of searching the address mapping information 470-1 and converting the LBA into a virtual address.

The second processor 430-3B allocates a virtual band and a virtual address that correspond to an LBA designated by a write command as follows.

Figure 14:
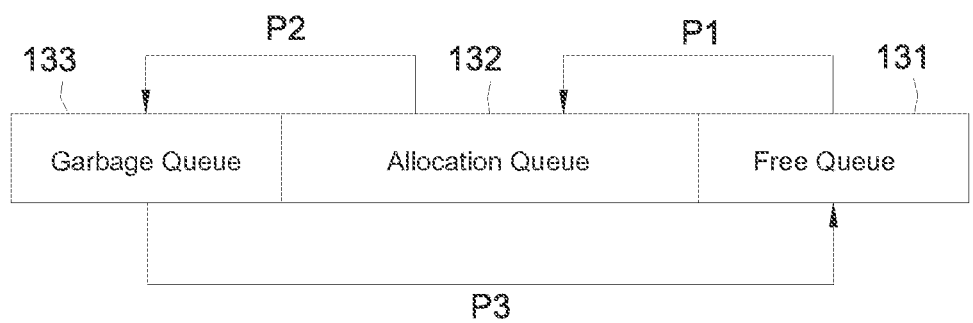
FIG. 14 is a detailed block diagram of a second processor shown in FIG. 13.

As shown in FIG. 14, the second processor 430-3B may include a free queue 131, an allocation queue 132, and a garbage queue 133. The second processor 430-3B converts an LBA for a writing position into a virtual address by using the free queue 131, the allocation queue 132, and the garbage queue 133.

The second processor 430-3B stores information about the virtual bands not assigned to a logical band in the free queue 131 in an order complying with a prescribed rule. The free queue 131 is means that stores information about virtual bands allocatable to a logical band in response to a command and is on standby for selection. The free queue 131 may store classified information about virtual bands allocatable to a logical band for each physical zone.

The second processor 430-3B stores information about virtual bands allocated to a logical band in the allocation queue 132. Specifically, if the virtual bands allocated to a logical band including an LBA for a writing position do not exist in the address mapping information 470-1 or all virtual addresses are already allocated and consumed for the virtual bands allocated to the logical band including the LBA for the writing position, the second processor 430-3B selects a virtual band on standby in the free queue 131, and allocates the virtual band to the logical band including the LBA for the writing position and moves it to the allocation queue 132.

Next, the second processor 430-3B allocates a virtual address corresponding to the LBA for the writing position based on the virtual band allocated to the logical band stored in the allocation queue 132. Concretely, if a new virtual address is allocated to the logical band including the LBA for the writing position and stored in the allocation queue 132, the second processor 430-3B allocates the newly allocated virtual address corresponding to the first sector of the logical band to the LBA for the writing position.

If a virtual band already allocated to the logical band including the LBA for the writing position exits in the allocation queue 132, the second processor 430-3B allocates a virtual address not allocated for the virtual band to the LBA for the writing position. For example, a virtual address of the sector right next to the last accessed sector in the virtual band can be allocated to the LBA for the writing position.

The second processor 430-3B selects a virtual band, whose number of virtual addresses invalidated because of data update exceeds a threshold value, from among the virtual bands allocated to the logical band, and moves it to the garbage queue 133 (P2).

For example, if the number of virtual bands stored in the free queue 131 is less than the initially set minimum value, the second processor 430-3B performs a garbage collection process. That is, the second processor 430-3B reads data stored in the sectors of valid virtual addresses from the virtual bands stored in the garbage queue 133, and executes rewriting to a newly allocated virtual address designated by a virtual band.

The second processor 430-3B moves information about the virtual band that has executed rewriting, among the virtual bands stored in the garbage queue 133, to the free queue 131 (P3).

Next, the third processor 430-3C controls the storage device to convert the virtual address converted in the second processor 430-3B into a physical address of the disk and access the storage medium in accordance with the converted physical address. That is, the third processor 430-3C generates a voice coil motor driving control signal for converting the virtual address into cylinder head sector (CHS) information representing the physical location of the disk and accessing the disk based on the converted CHS information.

Referring to FIGS. 4*a* and 4B, when the voice coil motor driving control signal generated by the third processor 430-3C is applied to the VCM driver 440, the VCM driver 440 generates a voice coil motor driving current corresponding to the voice coil motor driving control signal and supplies it to the voice coil motor 30. Therefore, the magnetic head 16 is moved to a track position of the disk desired to be accessed, and performs a data write or read operation corresponding to a command.

Next, a data writing method according to an embodiment of the inventive concept executed under the control of the processor 110 shown in FIGS. 1A and 1*b* or the processor 430 shown in FIGS. 4A and 4B will be described with reference to the flowchart of FIG. 15.

The processor 110 determines whether or not a write command is received from the host device 2000 (S101).

If a write command is received from the host device 2000 as a result of determination in the step 101 (S101), the processor 110 detects a cluster-based alignment state for a first area designated by a write command (s102). Various embodiments for detecting the cluster-based alignment state of the first area designated by the write command will be described with reference to FIGS. 16 to 18.

A method for detecting a cluster-based alignment state for the first area designated by a write command according to an embodiment of the present invention will be described with reference to FIG. 16.

The processor 110 determines whether or not the start position of the first area designated by the write command is aligned in units of clusters (S201). Specifically, the LBA value, among the (LBA, SIZE) information included in the write command, corresponds to multiples of the number of sectors corresponding to a cluster unit size, the processor 110 may detect the first area as being aligned with the start position of a cluster. For example, if the first area designated by the write command is as shown in FIGS. 24 and 25A, the start position of the first area is detected as being aligned in units of clusters.

If it is determined that the start position of the first area designated by the write command is aligned in units of clusters as a result of determination in the step 201 (S201), the processor 110 determines whether or not the end position of the first area designated by the write command is aligned in units of clusters (S202). For example, if the remainder of the (LBA+SIZE−1) value when divided by the number of sectors corresponding to the cluster unit size, the processor 110 may detect the first area as being aligned with the end position of a cluster, based on the (LBA, SIZE) information included in the write command. In another method, if the (LBA+SIZE) value corresponds to multiples of the number of sectors corresponding to the cluster unit size, the processor 110 may detect the first area as being aligned with the end position of a cluster.

If it is determined that the end position of the first area designated by the write command is not aligned in units of clusters as a result of determination in the step 202 (S202), the processor 110 detects this as the first state.

If it is determined that the start position of the first area designated by the write command is not aligned in units of clusters as a result of determination in the step 201 (S201), or that the end position of the first area designated by the write command is aligned in units of clusters as a result of determination in the step 202 (S202), the processor 110 detects this as the second state.

Figure 16:
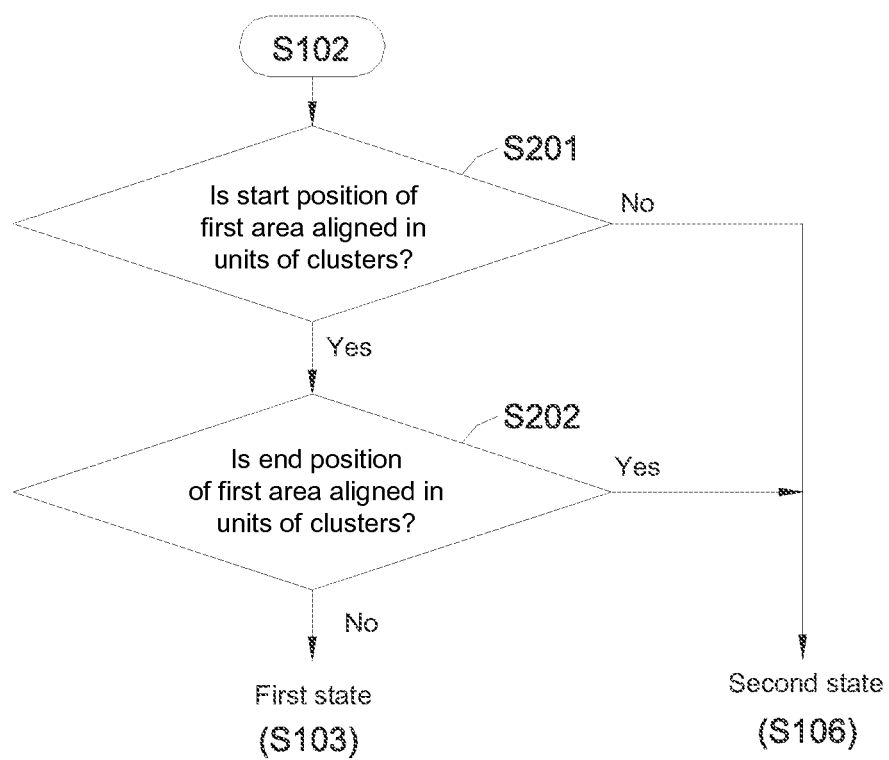
FIG. 16 is a detailed flowchart according to an embodiment for carrying out the process of the step 102 (S102) shown in FIG. 15.

In the flowchart of FIG. 16, only when the start position of the first area designated by the write command is aligned in units of clusters and the end position of the first area is not aligned in units of clusters, the first state is detected and a dummy write pattern is used to perform writing in units of clusters.

A method for detecting a cluster-based alignment state for the first area designated by a write command according to another embodiment of the present invention will be described with reference to FIG. 17.

The processor 110 determines whether or not the start position of the first area designated by the write command is aligned in units of clusters (S301). In the same manner as the step 201 (S201) explained in FIG. 16, it is determined whether or not the start position of the first area designated by the write command is aligned in units of clusters.

If it is determined that the start position of the first area designated by the write command is aligned in units of clusters as a result of determination in the step 301 (S301), the processor 110 determines whether or not the end position of the first area designated by the write command is aligned in units of clusters (S302). In the same manner as the step 202 (S202) explained in FIG. 16, it is determined whether or not the end position of the first area designated by the write command is aligned in units of clusters.

If it is determined that the end position of the first area designated by the write command is aligned in units of clusters as a result of determination in the step 302 (S302), the processor 110 detects this as the second state.

If it is determined that the start position of the first area designated by the write command is not aligned in units of clusters as a result of determination in the step 301 (S301), or that the end position of the first area designated by the write command is not aligned in units of clusters as a result of determination in the step 302 (S302), the processor 110 detects this as the first state.

A method for detecting a cluster-based alignment state for the first area designated by a write command according to yet another embodiment of the present invention will be described with reference to FIG. 18.

The processor 110 determines whether or not the end position of the first area designated by the write command is aligned in units of clusters (S401). In the same manner as the step 202 (S202) explained in FIG. 16, it is determined whether or not the end position of the first area designated by the write command is aligned in units of clusters.

If it is determined that the end position of the first area designated by the write command is not aligned in units of clusters as a result of determination in the step 401 (S401), the processor 110 determines whether or not the start position of the first area designated by the write command is aligned in units of clusters (S402). In the same manner as the step 201 (S201) explained in FIG. 16, it is determined whether or not the start position of the first area designated by the write command is aligned in units of clusters.

If it is determined that the start position of the first area designated by the write command is aligned in units of clusters as a result of determination in the step 402 (S402), the processor 110 detects this as the first state.

If it is determined that the end position of the first area designated by the write command is aligned in units of clusters as a result of determination in the step 401 (S401), or that the start position of the first area designated by the write command is not aligned in units of clusters as a result of determination in the step 402 (S402), the processor 110 detects this as the second state.

Figure 15:
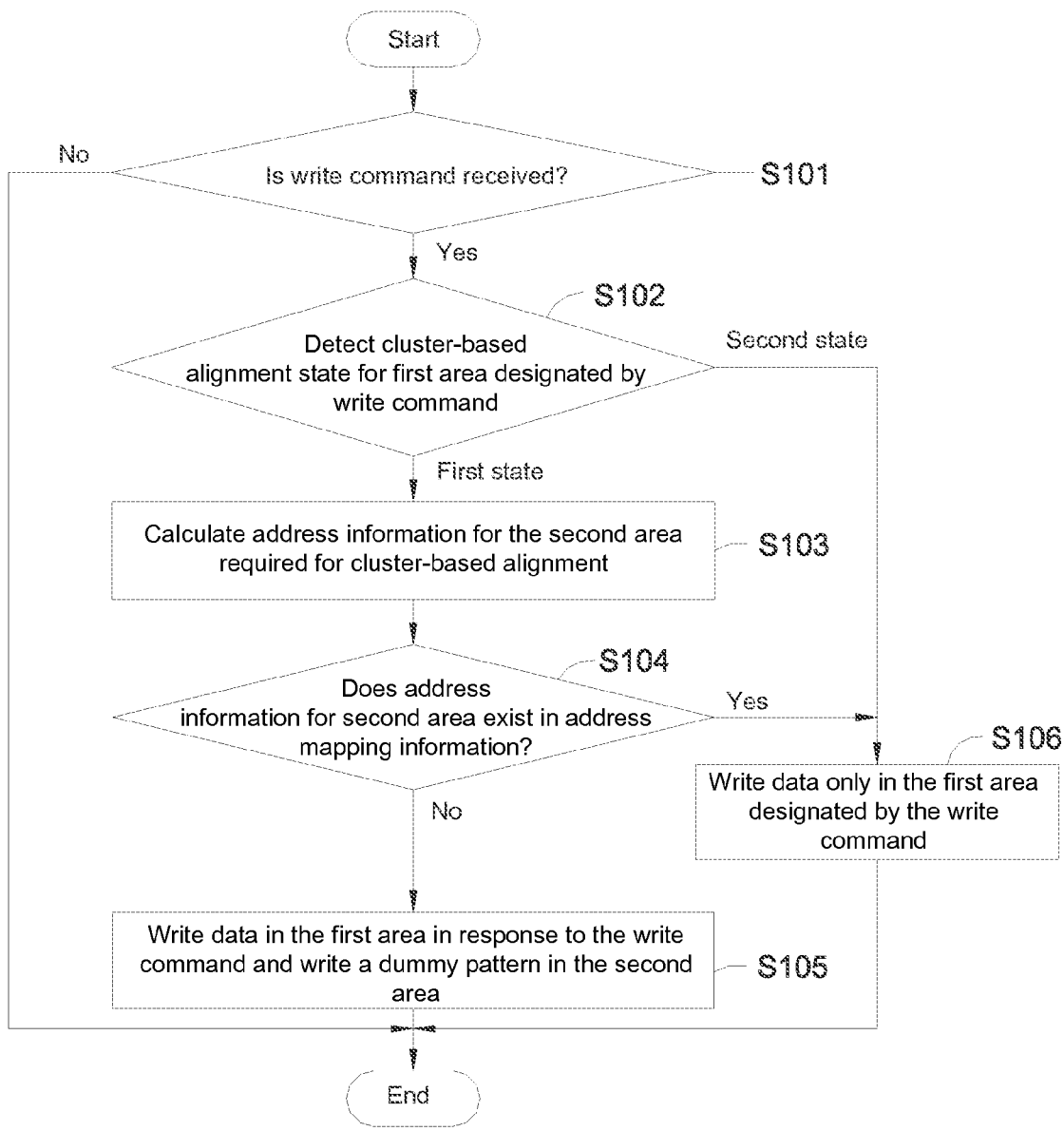
FIG. 15 is a flowchart of a data writing method according to an embodiment of the inventive concept.
Figure 17:
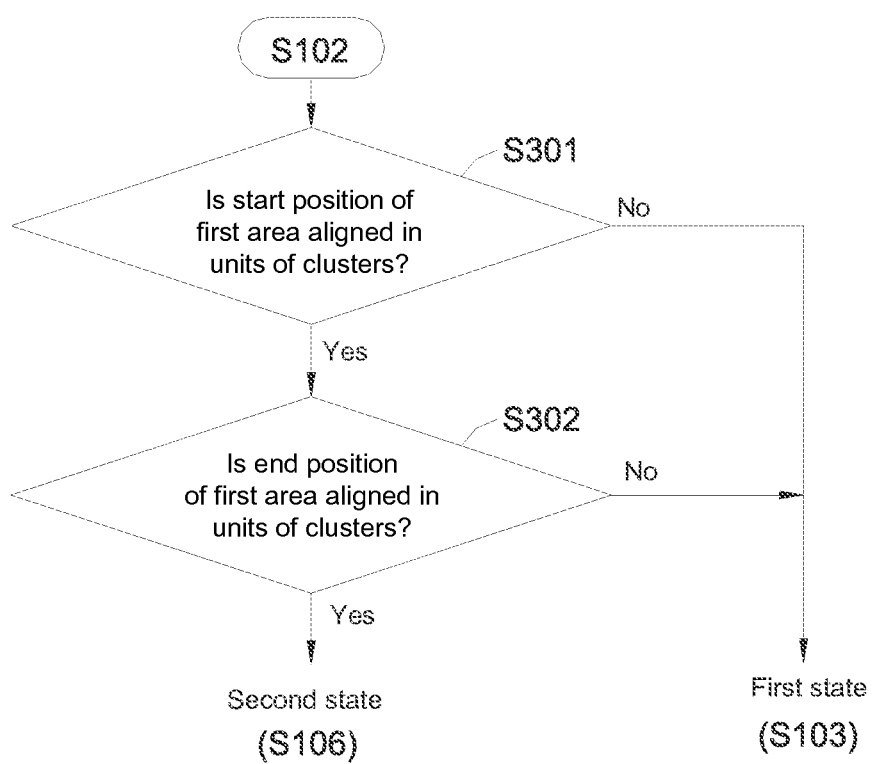
FIG. 17 is a detailed flowchart according to another embodiment for carrying out the process of the step 102 (S102) shown in FIG. 15.
Figure 18:
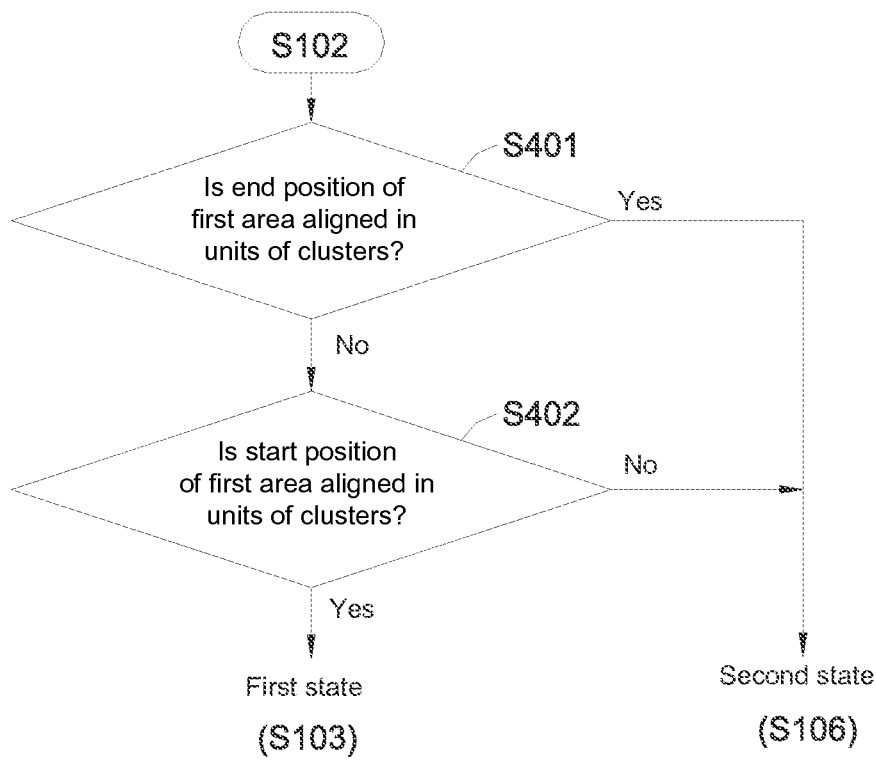
FIG. 18 is a detailed flowchart according to yet another embodiment for carrying out the process of the step 102 (S102) shown in FIG. 15.

A process for the step 102 (S102) shown in FIG. 15 can be performed according to the embodiments shown in FIGS. 16 to 18.

Referring again to FIG. 15, if the first state is detected as a result of detection in the step 102 (S102), the processor 110 calculates address information for the second area required for cluster-based alignment (S103).

Specifically, in the first state where the start position of the first area designated by the write command is aligned in units of clusters and the end position thereof is not aligned in units of clusters, the address information for the second area A2 is determined as address information for the first and second block addresses, which is obtained by adding the first logical block address to a remainder of the size information when divided by a cluster unit (CP) size and subtracting 1 from the first logical block address obtained by adding the size information to the logical block address LBA designated by the write command.

Next, in the first state where the start position of the first area designated by the write command is not aligned in units of clusters and the end position thereof is aligned in units of clusters, a remainder X1 of the logical block address LBA designated by the write command when divided by the cluster unit (CP) size is obtained, the starting address of the second area A2 is determined as having an (LBA−X1) value, and the end address of the second area A2 is determined as having an (LBA−1) value.

Also, in the first state where the start position of the first area designated by the write command is not aligned in units of clusters and the end position thereof is not aligned in units of clusters, two second areas A2' and A2" are required for cluster-based alignment. Address information for the two second areas A2' and A2" can be calculated as follows. A remainder X1 of the logical block address LBA designated by the write command when divided by the cluster unit (CP) size is obtained, the starting address of the second area A2' is determined as having an (LBA−X1) value, and the end address of the second area A2' is determined as having an (LBA−1) value. Also, a value obtained by adding SIZE information to the logical block address LBA designated by the write command may be determined as the starting address of the second area A2", and a value obtained by adding the starting address of the second area A2" to a remainder of the (SIZE+X1) value when divided by the cluster unit (CP) size and subtracting 1 may be determined as the end address of the second area A2".

The processor 110 determines whether or not the address information for the second area calculated in the step 103 (S103) exists in the address mapping information (S104). That is, the processor 110 determines whether or not the address for the second area exists in the address mapping information 470-1 stored in the RAM 130. For reference, if the address for the second area A2 exists in the address mapping information 470-1, this means that valid data is already stored in a physical zone of the storage medium 150 corresponding to the second area A2.

If the address information for the second area does not exist in the address mapping information as a result of determination in the step 104 (S104), the processor 110 controls the storage device so that data is written in the first area in response to the write command and a dummy pattern is written in the second area (S105). Also, the processor 110 generates mapping information as key information for the logical block addresses including the first area and the second area in response to the write command, and adds it to the address mapping information. Also, the processor 110 integrates mapping information into key information in an area of sequentially increasing LBAs and VAs, thereby generating address mapping information.

A detailed operation for executing the step 105 (S105) will be described with reference to FIG. 19.

Figure 19:
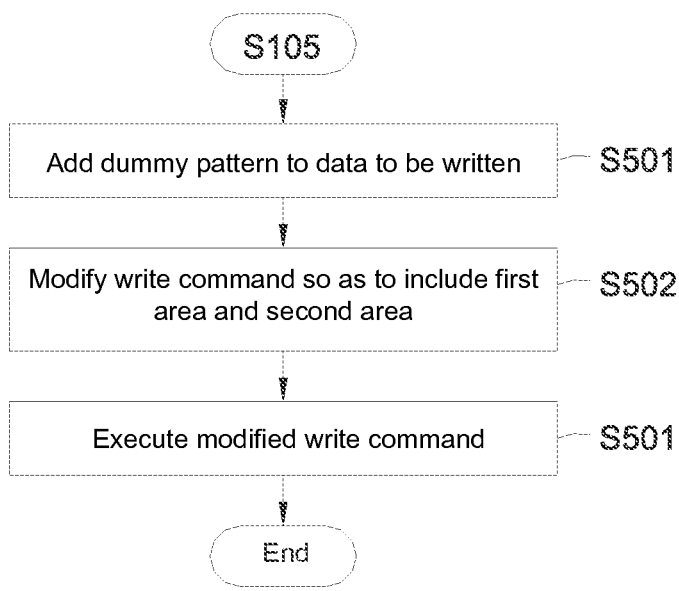
FIG. 19 is a detailed flowchart according to an embodiment for carrying out the process of the step 105 (S105) shown in FIG. 15.
Figure 20:
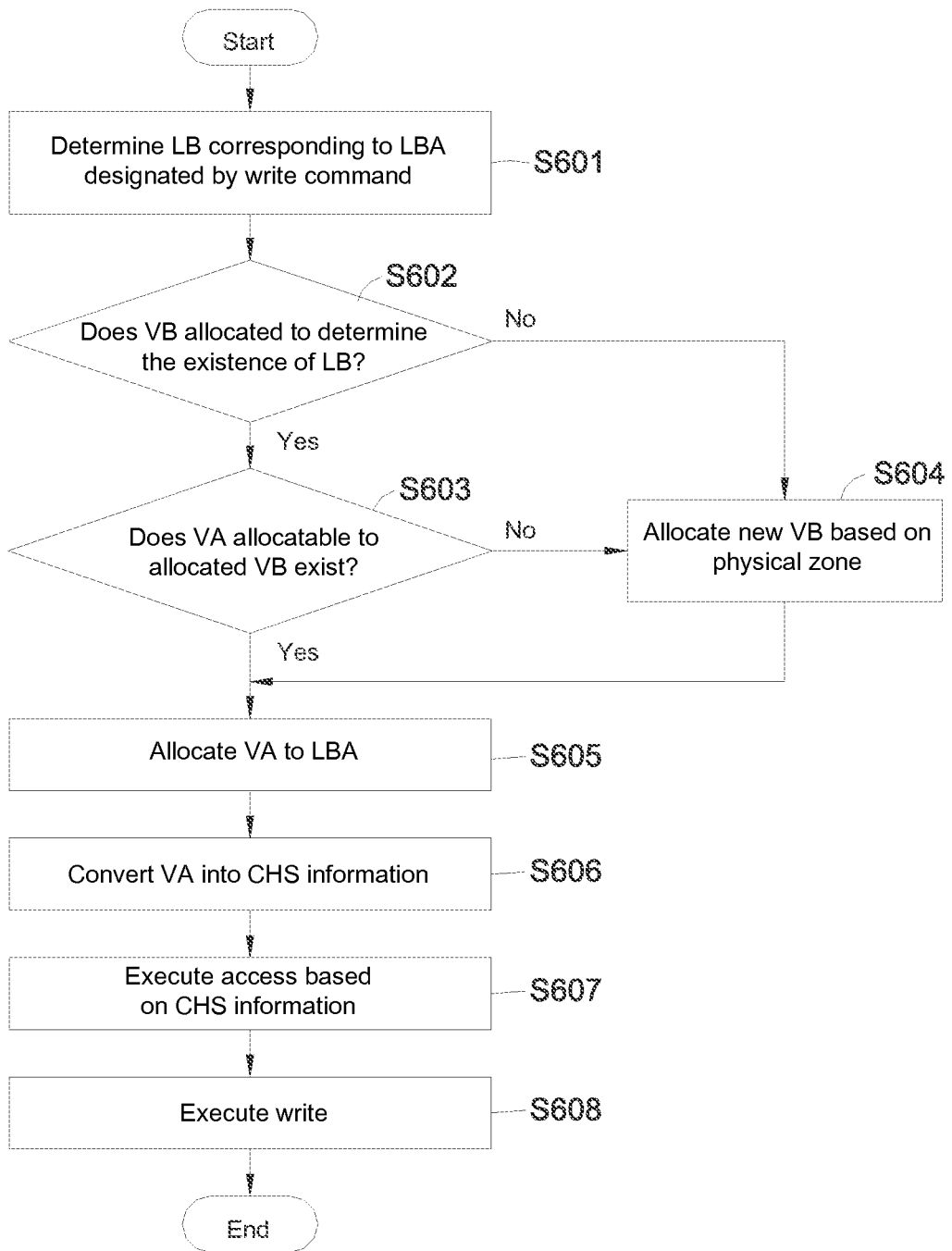
FIG. 20 is a detailed flowchart for carrying out a write operation according to the inventive concept.

Referring to FIG. 19, the processor 110 generates a dummy pattern to be written in the second area and adds it to data to be written (S501). That is, if the address information for the second area A2 calculated by the dummy write area calculation unit 520 of FIG. 12 does not exist in the address mapping information, the processor 110 generates a dummy pattern to be written in the calculated second area A2 and adds it to data to be written.

The operation of calculating the second area A2 has been described in detail in FIG. 12 and FIGS. 25A to 27B, so redundant description will be avoided.

Also, the processor 110 modifies the write command so as to include the first area and the second area (S502). That is, the processor 110 modifies the (LBA, SIZE) information representing a writing area designated by the write command so as to include the first area and the second area.

Next, the processor 110 performs a writing operation by applying the modified write command (S503). That is, it performs a writing operation by applying the modified (LBA, SIZE) information. A process for performing a writing operation in the disk drive of FIGS. 4A and 4B, which is an example of a data storage device, will be described in detail with reference to FIG. 20.

The processor 430 determines a logical band LB corresponding to an LBA to be written in response to a received write command or modified write command (S601). Specifically, the processor 430 determines a logical band corresponding to an LBA to be written according to a logical band number including an LBA to be written. For example, if logical band number 0 is allocated to LBAs 0 to 999, and an LBA to be written is 75, the logical band corresponding to the LBA to be written is determined as logical band number 0.

The processor 430 determines whether or not there exists a virtual band allocated to the logical band determined in the step 601 (S601) (S602). Specifically, the processor 430 searches the address mapping information 470-1 stored in the RAM 470 and determines whether or not there already exists a virtual band allocated to the logical band determined in the step 601 (S601).

If there exists a virtual band allocated to the logical band determined in the step 601 (S601) as a result of determination in the step 602 (S602), the processor 430 determines whether or not there exists a virtual address VA allocatable in the allocated virtual band (S603). That is, it is determined whether or not all virtual addresses allocatable in the allocated virtual band are consumed. If the last virtual address accessed by the allocated virtual band is the virtual address corresponding to the last sector included in the virtual band, it is determined that the virtual addresses are all consumed. For example, when the size of a virtual band is set to 200 sectors, and starting virtual addresses 0 to 199 are set for the virtual band, if the last virtual address accessed is 199, it is determined that the virtual addresses in the virtual band are all consumed.

If there exists no virtual band allocated to the logical band determined in the step 601 (S601) as a result of determination in the step 602 (S602), or there exists no virtual address allocatable in the allocated virtual band as a result of determination in the step 603 (S603), the processor 430 allocates a new virtual band to the logical band determined in the step 601 (S601) based on the physical zone (S604). That is, the processor 430 may allocate a virtual band not allocated to other logical bands, among the virtual bands included in the physical zone corresponding to the logical band including the LBA to be written, to the logical band including the LBA to be written. Next, the processor 430 allocates a virtual address VA corresponding to the LBA to be written based on the allocated virtual band (S605). Specifically, if a new virtual band is allocated by the step 604 (S604), the processor 430 allocates a starting virtual address representing the first sector of the newly allocated virtual band to the LBA designated by a command. Also, if there exists a virtual address allocatable to an LBA in a virtual band already allocated to a logical band, the processor 430 may allocate the next virtual address subsequent to the last virtual address accessed by the virtual band to an LBA designated by a command. The processor 430 generates address mapping information by integrating mapping information into key information in an area of sequentially increasing LBAs and VAs.

Next, the processor 430 generates the virtual address allocated in the step 605 (S605) into cylinder head sector (CHS) information corresponding to the physical access location information of the disk 12.

Next, the processor 430 executes a seek operation based on the CHS information corresponding to the physical access location information converted in the step 606 (S606) (S607).

Specifically, the processor 430 generates a voice coil motor driving control signal for moving the magnetic head 16 to a target track position of the disk 12 based on the converted CHS information. Referring to FIGS. 4A and 4B, when the thus-generated voice coil motor driving control signal is applied to the VCM driver 440, the VCM driver 440 generates a voice coil motor driving current corresponding to the voice coil motor driving control signal and supplies it to the voice coil motor 30. Therefore, the magnetic head 16 is moved to a track and sector position of the disk desired to be accessed.

After finishing the seek operation of the step 607 (S607), the processor 430 performs the operation of writing data or a dummy pattern in the sector position corresponding to a VA of the disk 12 (S608). As explained above, the processor 430 performs the operation of writing data in response to the write command in the first area and writing a dummy pattern in the second area.

By the above-described operation, a modified write command can be executed on the disk drive according to the step 503 (S503) shown in FIG. 19.

Referring again to FIG. 15, if the second state is detected as a result of detection in the step 102 (S102), or the address information of the second area exists in the address mapping information as a result of determination in the step 104 (S104), the processor 110 controls the storage medium interface 140 so as to write data in response to the write command only in the first area designated by the write command (S106). That is, in this case, a dummy write operation for cluster-based alignment is not performed.

Also, when the operation according to the flowchart shown in FIG. 15 is performed, writing is performed on the storage medium 150 as follows.

Figure 25B:
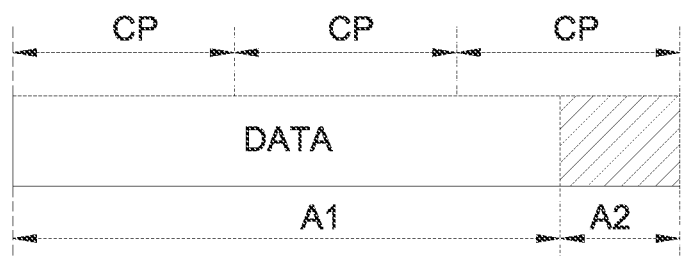
FIG. 25B is a conceptual diagram of a write area in which a dummy pattern is used for cluster-based alignment according to an embodiment of the present invention when the cluster-based alignment state of the first area designated by the write command is as shown in FIG. 25A.

If the first area A1 to be written by the write command is designated as shown in FIG. 25A and detected as the first state, and the address information of the second area A2 does not exist in the address mapping information, data received in response to the write command is written in the first area A1, and a dummy pattern is written in the shaded second area A2, as shown in FIG. 25B.

Figure 26B:
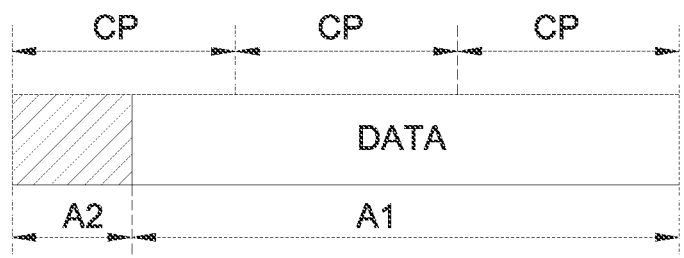
FIG. 26B is a conceptual diagram of a write area in which a dummy pattern is used for cluster-based alignment according to an embodiment of the present invention when the cluster-based alignment state of the first area designated by the write command is as shown in FIG. 26A.

If the first area A1 to be written by the write command is designated as shown in FIG. 26A and detected as the first state, and the address information of the second area A2 does not exist in the address mapping information, data received in response to the write command is written in the first area A1, and a dummy pattern is written in the shaded second area A2, as shown in FIG. 26B.

Figure 27B:
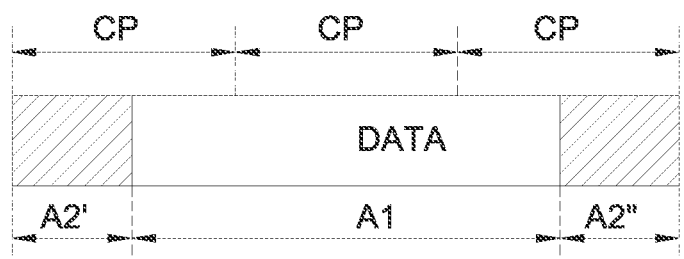
FIG. 27B is a conceptual diagram of a write area in which a dummy pattern is used for cluster-based alignment according to an embodiment of the present invention when the cluster-based alignment state of the first area designated by the write command is as shown in FIG. 27A.

If the first area A1 to be written by the write command is designated as shown in FIG. 27A and detected as the first state, and the address information of the second area A2 and A2" does not exist in the address mapping information, data received in response to the write command is written in the first area A1, and a dummy pattern is written in the shaded second area A2' and A2", as shown in FIG. 27B.

Next, a method for managing cluster alignment in a write operation via a network according to an embodiment of the inventive concept will be described.

First of all, a network system that performs the method for managing cluster alignment in a write operation via a network will be described with reference to FIG. 29.

Figure 29:
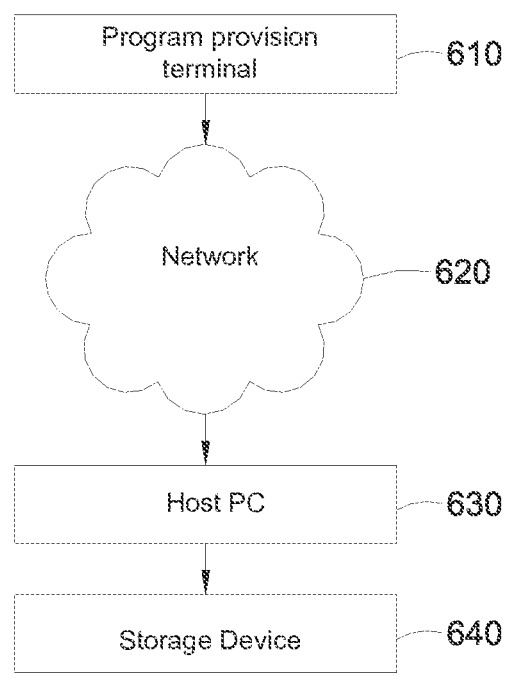
FIG. 29 is a view showing the network configuration for explaining a method for managing cluster alignment in a write operation via a network according to an embodiment of the inventive concept.

As shown in FIG. 29, the network system according to an embodiment of the inventive concept includes a program provision terminal 610, a network 620, a host PC 630, and a storage device 640.

The network 620 may be implemented as a communication network such as the internet. Obviously, the network 620 may be implemented as a wireless communication network, as well as a wired communication network.

The program provision terminal 610 stores a cluster alignment management program for performing the operation according to the flowcharts shown in FIGS. 15 to 20.

The program provision terminal 610 executes a process for transmitting the cluster alignment management program to the host PC 630 in response to a program transmission request from the host PC 630 connected via the network 620.

The host PC 630 is provided with hardware and software which is capable of connecting to the program provision terminal 610 via the network 620, requesting the transmission of the cluster alignment management program, and executing the operation of downloading the requested cluster alignment management program from the program provision terminal 610.

Also, the host PC 630 allows the method for managing cluster alignment in a write operation via a network according to an embodiment of the inventive concept based on the method shown in FIGS. 15 to 20 to be executed for the storage medium 640 by the cluster alignment management program downloaded from the program provision terminal 610.

Then, the method for managing cluster alignment in a write operation via a network according to an embodiment of the inventive concept will be described with reference to the flowchart of FIG. 30.

First of all, the host PC 630 using the storage device 640 such as a disk drive connects to the program provision terminal 610 via the network 620 (S701).

After connecting to the program provision terminal 610, the host PC 630 transmits information requesting the transmission of the cluster alignment management program to the program provision terminal 610 (S702).

Then, the program provision terminal 610 transmits the requested cluster alignment management program to the host PC 630, so that the host PC 630 downloads the cluster alignment management program (S703).

Next, the host PC 630 allows the downloaded cluster alignment management program to be executed on the storage device (S704). By executing the cluster alignment management program on the storage device, the method according to FIGS. 15 to 20 can be performed.

Figure 28A:
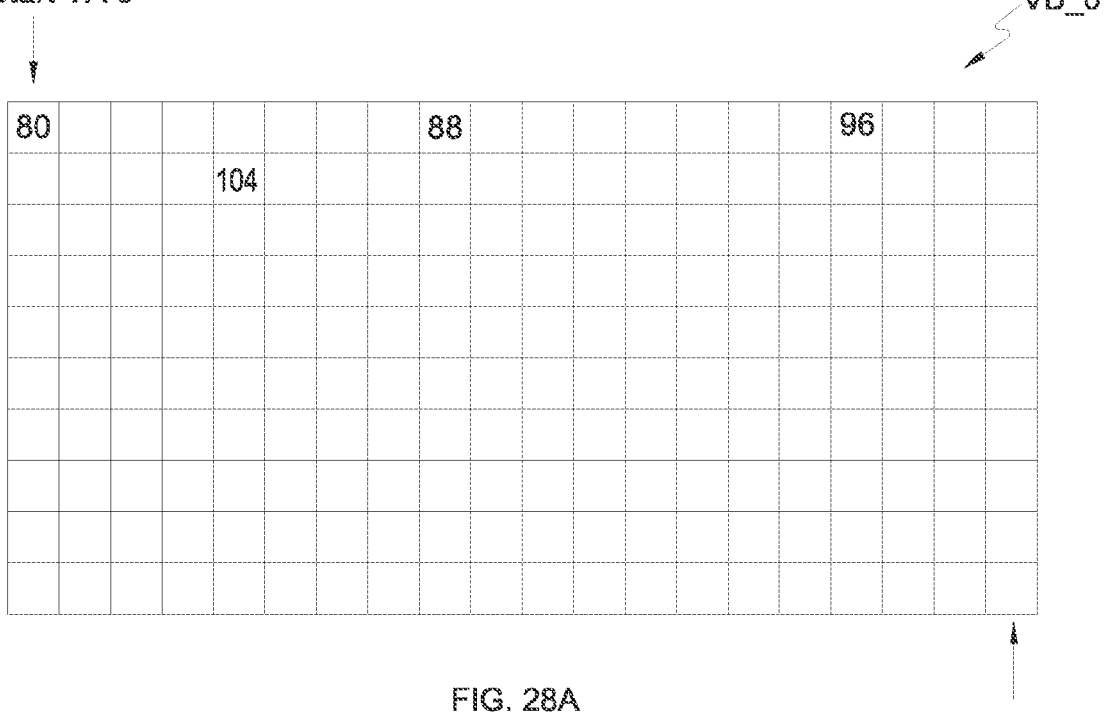
FIG. 28A is a view showing an example of a mapping state of LBAs and VAs when written to virtual band number 0 by applying the writing method according to the present invention.

When the disk drive using dynamic address conversion performs four write operations in which (LBA, SIZE) information included in a write command is set to (80, 1), (88, 1), (96, 1), and (104, 1) in an area having a cluster unit size of 8 sectors by applying the present invention, the state of virtual addresses mapped to LBAs in virtual band number 0 is as illustrated in FIG. 28A.

Since the cluster unit size is 8 sectors, writing is performed in units of 8 sectors for a write command for writing a single sector, as shown in FIG. 28A. If 1 track consists of 20 sectors, a writing operation is performed in at least two tracks.

Also, when the writing operation is performed as above, the LBA sequentially increases from LBA 80 to LBA 111, and the corresponding virtual address sequentially increases from VA 0 to VA 31. Accordingly, within the range of LBA 80 to LBA 111, mapping information of the VAs corresponding to the LBAs can be represented as address mapping information.

Figure 28B:
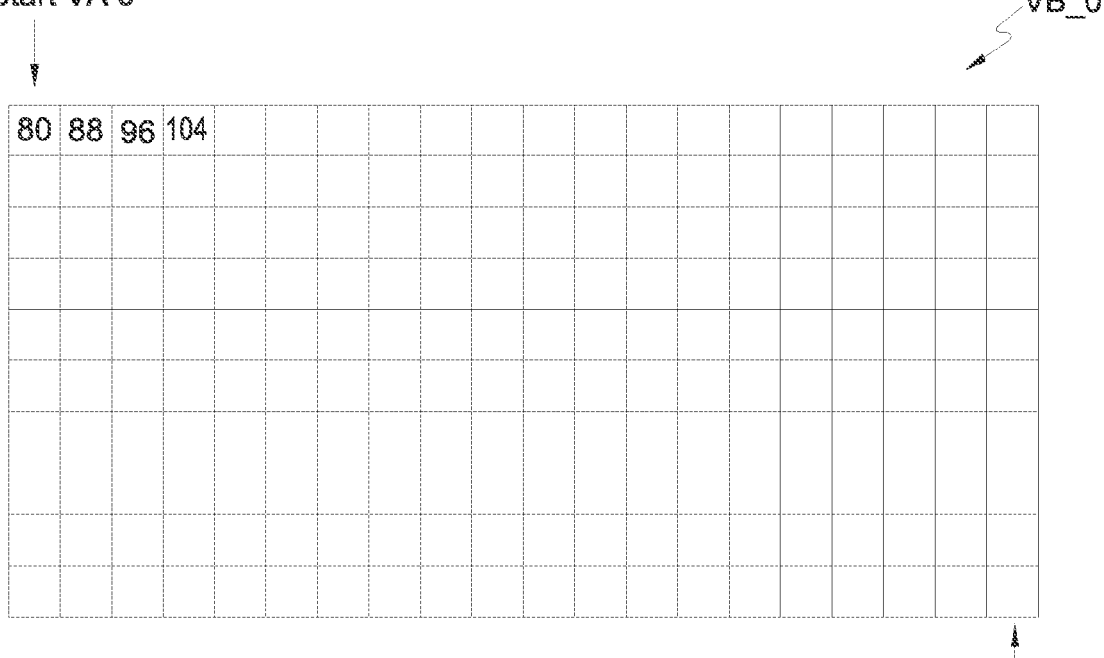
FIG. 28B is a view showing an example of a mapping state of LBAs and VAs when written to virtual band number 0 without applying the writing method according to the present invention.

When the disk drive using dynamic address conversion performs four write operations in which (LBA, SIZE) information included in a write command is set to (80, 1), (88, 1), (96, 1), and (104, 1) in an area having a cluster unit size of 8 sectors without applying the present invention, the state of virtual addresses mapped to LBAs in virtual band number 0 is as illustrated in FIG. 28B. If 1 track consists of 20 sectors, a writing operation is performed in at least one track.

Because writing is executed only for the sectors corresponding to the respective LBAs designated by the write command, the state of the virtual addresses mapped to the LBAs in virtual band number 0 is as illustrated in FIG. 28B. Also, mapping information of the VAs addresses corresponding to the LBAs according to the write operation is represented as four address mapping information.

An embodiment may be a data writing method comprising the steps of: detecting an initially set storage unit alignment state for a first area designated by a write command; calculating address information for a second area not included in the first area within the units of storage corresponding to the first area based on the detection result; and if the calculated address information for the second area does not exist in address mapping information, writing data in response to the write command in the first area and writing a dummy pattern in the second area. An embodiment may also include wherein, if the start position of the first area is aligned in units of storage, and the end position of the first area is not aligned in units of storage, the step of calculating the address information for the second area is performed. An embodiment may also include wherein the address information for the second area is determined as the address information for the first and second block addresses, which is obtained by adding the first logical block address to a remainder of the size information when divided by a storage unit size and subtracting 1 from the first logical block address obtained by adding the size information to the logical block address designated by the write command.

An embodiment may also include wherein, if the start position of the first area or the end position of the first area is not aligned in units of storage, the step of calculating the address information for the second area is performed. An embodiment may also include wherein the address information for the second area is determined as the address information for the logical block addresses including the next logical block address subsequent to the logical bock address for the end position of the first area and the logical block address for the end position of a storage unit area corresponding to the first area. An embodiment may also include wherein the address mapping information comprises information for converting a logical block address received from a host device into a physical address of a storage medium so that writing is sequentially performed in one direction in a virtual band corresponding to a physical zone of the storage medium.

An embodiment may also include wherein, if the calculated address information for the second area is not allocated to the address mapping information, the logical block address information and size information included in the write command is modified so as to include the first area and the second area, and a dummy pattern is added to data to be written in response to the write command so that data received from the host device is written in the first area in response to the write command and a dummy pattern is written in the second area.

Another embodiment may include a storage device comprising: a storage medium; a storage medium interface for accessing the storage medium to write or read data; a memory device for storing address mapping information; and a processor for controlling the storage medium interface to write data to the storage medium or read data from the storage medium, wherein the processor executes a write operation on a modified area designated by a write command or modified data to be written so that data is written on the storage medium in units of at least one cluster based on the address mapping information. An embodiment may also include wherein the processor controls the storage medium interface to modify the area designated by the write command and write a dummy pattern in the area modified from the area designated by the write command so that a data writing area on the storage medium is aligned in units of at least one cluster. An embodiment may also include wherein the processor comprises: a cluster-based alignment detection unit that detects a cluster-based alignment state for the first area designated by the write command; a dummy write area calculation unit that calculates address information for a second area not included in the first area within the clusters corresponding to the first area based on the detection result of the cluster-based alignment detection unit; an address mapping information searching unit that determines whether or not the address information for the second area exists in the address mapping information stored in the memory device; a dummy pattern generation unit that generates a dummy pattern to be written in the second area; and a write area modifying unit that modifies a writing area designated by the write command so as to include the first area and the second area, wherein the storage medium interface is controlled so that data is written in the first area in response to the write command and a dummy pattern is written in the second area.

The present invention is applicable to storage devices using a variety of write methods, as well as a disk drive using a shingle write method.

The present invention can be realized as a method, an apparatus, a system and so on. When the present invention is realized as software, the members of the present invention are code segments which execute necessary operations. Programs or code segments may be stored in a processor readable medium. The processor readable medium may be any medium which can store or transmit information, such as an electronic circuit, a semiconductor memory device, a ROM, a flash memory, an EROM (Erasable ROM), a floppy disc, an optical disc, a hard disc, or the like.

Although the invention has been described with reference to particular embodiments, it will be apparent to one of ordinary skill in the art that modifications to the described embodiments may be made without departing from the spirit and scope of the invention. Therefore, it is obvious that the present invention is not restricted to the specific structures or arrangements shown or described in this specification.

What is claimed is:

1. A method comprising:
receiving a write request from a host containing host data for writing to a target location of a data storage medium, a target location comprising at least one cluster, a cluster having multiple sequentially-numbered data storage addresses of the data storage medium;
writing the at least one cluster with write data including host data and dummy data pursuant to the write request, the at least one cluster including a headmost storage address at a headmost boundary of the at least one cluster and a terminal storage address at a terminal boundary of the at least one cluster, dummy data being arbitrary data written to fill data storage addresses in the target location not written by host data, the writing including:
determining a segment of the at least one cluster to be written by the host data and add the host data to the write data;
adding the dummy data for writing to one or more first consecutive storage addresses of the at least one cluster to the write data when the one or more first consecutive storage addresses are not to be written by host data and when existing data is not already stored in the one or more first consecutive storage addresses, the one or more first consecutive storage addresses including the headmost storage address of the at least one cluster; and
adding the dummy data for writing to one or more last consecutive storage addresses of the at least one cluster to the write data when the one or more last consecutive storage addresses are not to be written by host data and when existing data is not already stored in the one or more last consecutive storage addresses, the one or more last consecutive storage addresses including the terminal storage address of the at least one cluster; and
writing the write data to the at least one cluster.

2. The method of claim 1, further comprising:
determining whether the host data will completely fill the target location; and
calculating the data storage addresses of the target location which will not be filled by the host data when the host data will not completely fill the target location.

3. The method of claim 2, further comprising:
checking an address map to determine whether existing data is already stored in the data storage addresses of the target location which will not be filled by the host data, the address map including a database of information regarding the storage state of data storage locations of the data storage medium; and
not writing dummy data to data storage addresses of the target location which contain existing data.

4. The method of claim 3, further comprising:
updating the address map to reflect the written host data; and
updating the address map to reflect the dummy data when dummy data is written to the target location.

5. The method of claim 3 further comprising:
checking the address map including the database of information, the database of information including:
a first storage address of a set of sequentially-numbered data storage addresses of valid data; and
a value representing the number of sequential addresses in the set of sequentially-numbered data storage addresses.

6. The method of claim 2, further comprising:
determining whether the host data will completely fill the at least one cluster of the target location via:
determining whether a first storage address of the host data from the write request is aligned to the headmost boundary of the at least one cluster;
determining whether a last storage address of the host data from the write request is aligned to the terminal boundary of the at least one cluster;
calculating the data storage addresses of the target location which will not be filled by the host data when the host data will not completely fill the at least one cluster of the target location via:
calculating storage addresses between the headmost storage address of the at least one cluster and the first storage address of the host data; and
calculating storage addresses between the terminal storage address of the at least one cluster and the last storage address of the host data.

7. The method of claim 1:
further comprising receiving the write request for writing to the target location of the data storage medium, the data storage medium including a disc storage medium; and
the writing at least one cluster of the target location with host data and dummy data pursuant to the write request includes writing the host data and dummy data to the disc storage medium in a shingled writing format such that writing of a first track overlaps at least a portion of a second track.

8. An apparatus comprising:
a data storage medium;
a processor configured to:
receive a write request from a host containing host data for writing to a target location of the data storage medium, a target location including one or more clusters, a cluster including multiple sequentially-numbered data storage addresses of the data storage medium;
determine whether the host data will completely fill the clusters of the target location;
when the host data will not completely fill the clusters of the target location:
calculate data storage addresses in the target location which will not be filled by the host data;
write at least one cluster of the target location with host data and dummy data pursuant to the write request, the at least one cluster including a first storage address at an initial boundary of the at least one cluster and a last storage address at a final boundary of the at least one cluster, dummy data being arbitrary data written to fill the data storage addresses in the target location not written by host data, the write including:
write the dummy data to one or more first consecutive storage addresses of the at least one cluster when the one or more first consecutive storage addresses are not to be written by host data and when host data does not already exist in the one or more first consecutive storage addresses, the one or more first consecutive storage addresses including the first storage address of the at least one cluster; and
write the dummy data to one or more last consecutive storage addresses of the at least one cluster when the one or more last consecutive storage addresses are not to be written by host data and when host data does not already exist in the one or more last consecutive storage addresses, the one or more last consecutive storage addresses including the last storage address of the at least one cluster.

9. The apparatus of claim 8, further comprising a network interface, and the processor is configured to retrieve a set of instructions over the network interface that, when executed by the processor, control the operation of the apparatus.

10. The apparatus of claim 8, further comprising the processor configured to:
check an address map to determine whether existing data is already stored in the data storage addresses of the target location which will not be filled by the host data, the address map comprising a database of information regarding the storage state of data storage locations of the data storage medium; and
not write dummy data to data storage addresses of the target location which contain existing data.

11. The apparatus of claim 10, further comprising the processor configured to:
update the address map to reflect the written host data; and
update the address map to reflect the dummy data when dummy data is written to the target location.

12. The apparatus of claim 10:
the database of information of the address map includes:
a first storage address of a set of sequentially-numbered data storage addresses of current data; and
a value representing the number of sequential addresses in the set of sequentially-numbered data storage addresses.

13. The apparatus of claim 8:
the data storage medium includes a disc storage medium; and
the processor is configured to write at the least one cluster of the target location with host data and dummy data pursuant to the write request in a shingled manner such that writing a second track overlaps at least a portion of a first track.

14. An apparatus comprising:
a memory device storing instructions that when executed by a computer cause the computer to perform a method comprising:
receiving a write request from a host containing host data for writing to a target location of a data storage medium, a target location comprising at least one cluster, a cluster being multiple sequentially-numbered data storage addresses for data sectors of the data storage medium;
writing the at least one cluster with write data including host data and dummy data pursuant to the write request, the at least one cluster including a first storage address for a data sector at an initial boundary of the at least one cluster and a last storage address for a data sector at a final boundary of the at least one cluster, dummy data being arbitrary data written to fill data storage addresses in the target location not written by host data, the writing including:

determining a segment of the at least one cluster to be occupied by the host data and add the host data to the write data;

adding the dummy data for writing to one or more first consecutive storage addresses of the at least one cluster to the write data when the one or more first consecutive storage addresses are not to be written by host data and when existing data is not already stored in the one or more first consecutive storage addresses, the one or more first consecutive storage addresses including the first storage address of the at least one cluster;

adding the dummy data for writing to one or more last consecutive storage addresses of the at least one cluster to the write data when the one or more last consecutive storage addresses are not to be written by host data and when existing data is not already stored in the one or more last consecutive storage addresses, the one or more last consecutive storage addresses including the last storage address of the at least one cluster; and writing the write data to the at least one cluster.

15. The apparatus of claim 14, the method further comprising:

determining whether the host data will completely fill the target location; and calculating the data storage addresses of the target location which will not be filled by the host data when the host data will not completely fill the target location.

16. The apparatus of claim 15, the method further comprising:

checking an address map to determine whether existing data is already stored in the data storage addresses of the target location which will not be filled by the host data, the address map including a database of information regarding the storage state of data storage locations of the data storage medium; and not writing dummy data to data storage addresses of the target location which contain existing data.

17. The apparatus of claim 16:

the database of information of the address map includes:
a first storage address of a set of sequentially-numbered data storage addresses of valid data; and
a value representing the number of sequential addresses in the set of sequentially-numbered data storage addresses.

18. The apparatus of claim 15, the method further comprising determining whether the host data will completely fill the at least one cluster of the target location via:
determining whether a first storage address of the host data from the write request is aligned to the initial boundary of the at least one cluster;
determining whether a last storage address of the host data from the write request is aligned to the final boundary of the at least one cluster;

calculating the data storage addresses of the target location which will not be filled by the host data when the host data will not completely fill the at least one cluster of the target location via:
calculating storage addresses between the initial storage address of the at least one cluster and the first storage address of the host data; and
calculating storage addresses between the final storage address of the at least one cluster and the last storage address of the host data.

19. The apparatus of claim 14:

the method further comprises receiving the write request for writing to the target location of the data storage medium, the data storage medium including a disc storage medium; and the writing at least one cluster of the target location with host data and dummy data pursuant to the write request comprises writing the host data and dummy data to the disc storage medium in a shingled writing format such that writing of a first track overlaps at least a portion of a second track.

* * * * *